US012698654B2

(12) United States Patent
Condron

(10) Patent No.: US 12,698,654 B2
(45) Date of Patent: Aug. 4, 2026

(54) VEHICULAR DOOR HANDLE ASSEMBLY WITH PROTRUDING HANDLE PORTION

(71) Applicant: Magna Mirrors of America, Inc., Holland, MI (US)

(72) Inventor: Timothy W. Condron, Canton, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 172 days.

(21) Appl. No.: 18/492,824

(22) Filed: Oct. 24, 2023

(65) Prior Publication Data

US 2024/0133219 A1 Apr. 25, 2024
US 2024/0229520 A9 Jul. 11, 2024

Related U.S. Application Data

(60) Provisional application No. 63/513,606, filed on Jul. 14, 2023, provisional application No. 63/384,779, filed on Nov. 23, 2022, provisional application No. 63/380,586, filed on Oct. 24, 2022.

(51) Int. Cl.
*E05B 81/76* (2014.01)
*E05B 85/10* (2014.01)
*E05B 85/18* (2014.01)

(52) U.S. Cl.
CPC .............. *E05B 81/76* (2013.01); *E05B 85/18* (2013.01); *E05B 85/103* (2013.01)

(58) Field of Classification Search
CPC .......... E05B 85/107; E05B 85/18; E05B 5/00; E05B 81/64; E05B 81/76
See application file for complete search history.

(56) References Cited

U.S. PATENT DOCUMENTS 4,554,808 A * 11/1985 Escaravage .............. E05B 77/48 292/201
5,497,305 A 3/1996 Pastrick et al.
5,671,996 A 9/1997 Bos et al.
5,938,321 A 8/1999 Bos et al.
6,086,229 A 7/2000 Pastrick
6,139,172 A 10/2000 Bos et al.
(Continued)

FOREIGN PATENT DOCUMENTS

DE 10309821 A1 * 9/2004 .............. E05B 77/02
DE 102019131339 A1 * 5/2021 .............. E05B 81/76
(Continued)

*Primary Examiner* — Christine M Mills
*Assistant Examiner* — Faria F Ahmad
(74) *Attorney, Agent, or Firm* — HONIGMAN LLP

(57) ABSTRACT

A vehicular exterior door handle assembly includes a base portion configured to mount at a door of a vehicle, a handle portion extending from the base portion, and an electronic switch disposed within the handle portion. The handle portion includes (i) a fixed portion that, with the base portion mounted at the door of the vehicle, extends outward at the door of the vehicle, and (ii) a movable portion disposed within the fixed portion. When the handle portion is grasped by a user, the movable portion moves to actuate the electronic switch. With the base portion mounted at the door of the vehicle, and when the electronic switch is actuated, the electronic switch actuates a latching mechanism of the door to unlock, lock and/or open the door.

15 Claims, 26 Drawing Sheets

(56) References Cited

U.S. PATENT DOCUMENTS

| | | | | |
|---|---|---|---|---|
| 6,149,287 | A | 11/2000 | Pastrick et al. | |
| 6,152,590 | A | 11/2000 | Furst et al. | |
| 6,176,602 | B1 | 1/2001 | Pastrick et al. | |
| 6,276,821 | B1 | 8/2001 | Pastrick et al. | |
| 6,280,069 | B1 | 8/2001 | Pastrick et al. | |
| 6,291,905 | B1 | 9/2001 | Drummond et al. | |
| 6,349,450 | B1 | 2/2002 | Koops et al. | |
| 6,396,408 | B2 | 5/2002 | Drummond et al. | |
| 6,416,208 | B2 | 7/2002 | Pastrick et al. | |
| 6,477,464 | B2 | 11/2002 | McCarthy et al. | |
| 6,550,103 | B2 | 4/2003 | Koops et al. | |
| 6,568,839 | B1 | 5/2003 | Pastrick et al. | |
| 6,907,643 | B2 | 6/2005 | Koops et al. | |
| 6,977,619 | B2 | 12/2005 | March et al. | |
| 7,407,203 | B2 | 8/2008 | Huizenga et al. | |
| 8,333,492 | B2 | 12/2012 | Dingman et al. | |
| 8,786,401 | B2 | 7/2014 | Sobecki et al. | |
| 11,851,920 | B2 | 12/2023 | Peterson et al. | |
| 12,241,291 | B2 * | 3/2025 | Mensch | E05B 85/18 |
| 2001/0004233 | A1 * | 6/2001 | Suparschi | G07C 9/00309 340/426.28 |
| 2001/0005082 | A1 * | 6/2001 | Suparschi | E05B 85/18 292/347 |
| 2002/0046439 | A1 * | 4/2002 | Agostini | E05B 81/76 16/110.1 |
| 2002/0046440 | A1 * | 4/2002 | Agostini | E05B 81/78 16/110.1 |
| 2002/0108310 | A1 * | 8/2002 | Schroer | E05F 11/52 49/280 |
| 2008/0000711 | A1 * | 1/2008 | Spurr | E05B 77/30 180/289 |
| 2010/0007463 | A1 | 1/2010 | Dingman et al. | |
| 2011/0148575 | A1 * | 6/2011 | Sobecki | E05B 5/006 292/336.3 |
| 2012/0167642 | A1 * | 7/2012 | Savant | E05B 81/76 70/91 |
| 2015/0059424 | A1 * | 3/2015 | Hunt | E05B 81/76 292/336.3 |
| 2016/0369537 | A1 * | 12/2016 | Rocci | E05B 85/103 |
| 2017/0260780 | A1 * | 9/2017 | Christensen | E05B 85/103 |
| 2018/0058114 | A1 * | 3/2018 | Brown | E05B 81/90 |
| 2018/0106082 | A1 * | 4/2018 | Brown | E05B 85/107 |
| 2018/0163442 | A1 * | 6/2018 | Soonthornwinate | E05B 81/76 |
| 2019/0078360 | A1 * | 3/2019 | Blount | E05B 85/103 |
| 2019/0218835 | A1 * | 7/2019 | Karlein | E05B 85/103 |
| 2019/0284847 | A1 * | 9/2019 | Malvy | E05B 81/06 |
| 2020/0102773 | A1 | 4/2020 | Sobecki | |
| 2020/0173204 | A1 * | 6/2020 | Murata | E05B 81/06 |
| 2021/0002928 | A1 * | 1/2021 | Toyama | E05B 81/56 |
| 2021/0062558 | A1 * | 3/2021 | Beck | E05B 81/90 |
| 2022/0018168 | A1 | 1/2022 | Cervone et al. | |
| 2022/0282534 | A1 | 9/2022 | Peterson et al. | |
| 2022/0341226 | A1 | 10/2022 | Sobecki et al. | |
| 2023/0258029 | A1 * | 8/2023 | Philippe | E05B 85/103 70/277 |
| 2023/0340812 | A1 * | 10/2023 | Rudolf | E05B 85/103 |
| 2024/0240505 | A1 * | 7/2024 | Heilmann | B60J 10/86 |
| 2025/0163734 | A1 * | 5/2025 | Calor | E05B 85/107 |

FOREIGN PATENT DOCUMENTS

| | | | | |
|---|---|---|---|---|
| EP | 4194652 | A1 * | 6/2023 | E05B 85/18 |
| FR | 3096713 | A1 * | 12/2020 | E05B 85/10 |

* cited by examiner

VEHICULAR DOOR HANDLE ASSEMBLY WITH PROTRUDING HANDLE PORTION

CROSS REFERENCE TO RELATED APPLICATIONS

The present application claims the filing benefits of U.S. provisional application Ser. No. 63/513,606, filed Jul. 14, 2023, U.S. provisional application Ser. No. 63/384,779, filed Nov. 23, 2022, and U.S. provisional application Ser. No. 63/380,586, filed Oct. 24, 2022, which are hereby incorporated herein by reference in their entireties.

FIELD OF THE INVENTION

The present invention relates to handles for vehicles and, more particularly, to an exterior handle for opening a side door and/or liftgate of a vehicle.

BACKGROUND OF THE INVENTION

A door handle for a vehicle door typically includes a handle portion that is pivotable relative to a base portion, whereby pivotal movement of the handle portion actuates a latch mechanism to open the door. Typically, a door handle is a pull strap handle with a strap handle portion that protrudes outwardly from the side of the vehicle for grasping and pulling and moving by the person opening the door of the vehicle. Alternately, paddle type door handle assemblies are known, where a paddle portion is pivotally mounted to a base portion and is pulled and moved generally outwardly and upwardly to open the vehicle door.

SUMMARY OF THE INVENTION

A door handle assembly for opening a door of a vehicle (such as a side door or rear door or liftgate of a vehicle) includes a handle portion that is disposed at the door and has a protruding handle or actuating portion that extends from a base portion or bracket portion. In some implementations, the base portion attaches the handle assembly at the door and the handle portion protrudes at the side of the door for a user to grasp or pull to open the door. The handle portion includes an electronic switch for actuating a door locking mechanism and/or opening mechanism. The handle portion includes a movable lever or portion that, when the handle portion is grasped by a user, moves or pivots to actuate the electronic switch to open the vehicle door. The movable portion and the electronic switch are located at the non-moving handle portion and are electrically connected to an electrical connector of the vehicle door when the handle assembly is mounted at the vehicle door. Thus, the entire switch module is located within or inside the portion of the handle assembly that is located outside of the vehicle door. The switch module is made to have a low profile or thickness dimension and is integrated into the protruding handle portion, whereby a user physically touches/pushes the switch pad at the protruding handle portion when opening the vehicle door.

In some implementations, a vehicular exterior door handle assembly includes a base portion configured to mount at a door of a vehicle equipped with the vehicular exterior door handle assembly, a handle portion extending from the base portion, and an electronic switch disposed within the base portion. The handle portion, with the base portion mounted at the door of the vehicle, extends outward at the door of the vehicle. When the handle portion is grasped by a user, the handle portion moves to actuate the electronic switch. The base portion is mounted at the door of the vehicle. When the electronic switch is actuated, the electronic switch actuates a latching mechanism of the door to unlock, lock, and/or open the door.

In some implementations, the dual action vehicular exterior door handle assembly includes a base portion configured to mount at a door of a vehicle equipped with the vehicular exterior door handle assembly, a handle portion extending from the base portion, and first and second electronic switches disposed within the base portion. When the handle portion is moved by a user in a first direction, the handle portion moves to actuate the first electronic switch. When the handle portion is moved by the user in a second opposite direction, the handle portion moves to actuate the second electronic switch. When the first electronic switch is actuated, the first electronic switch actuates a first mechanism of the door to unlock the door. When the second electronic switch is actuated, the second electronic switch actuates a second mechanism of the door to lock the door.

These and other objects, advantages, purposes, and features of the present invention will become apparent upon review of the following specification in conjunction with the drawings.

DESCRIPTION OF THE PREFERRED EMBODIMENTS

Figure 1:
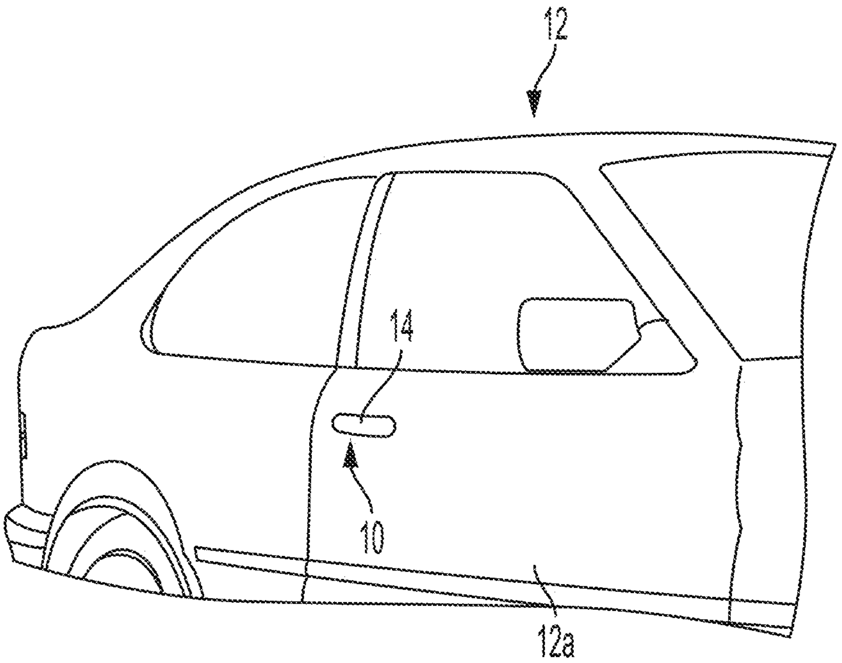
FIG. 1 is a perspective view of a vehicle with a door handle assembly.
Figure 2:
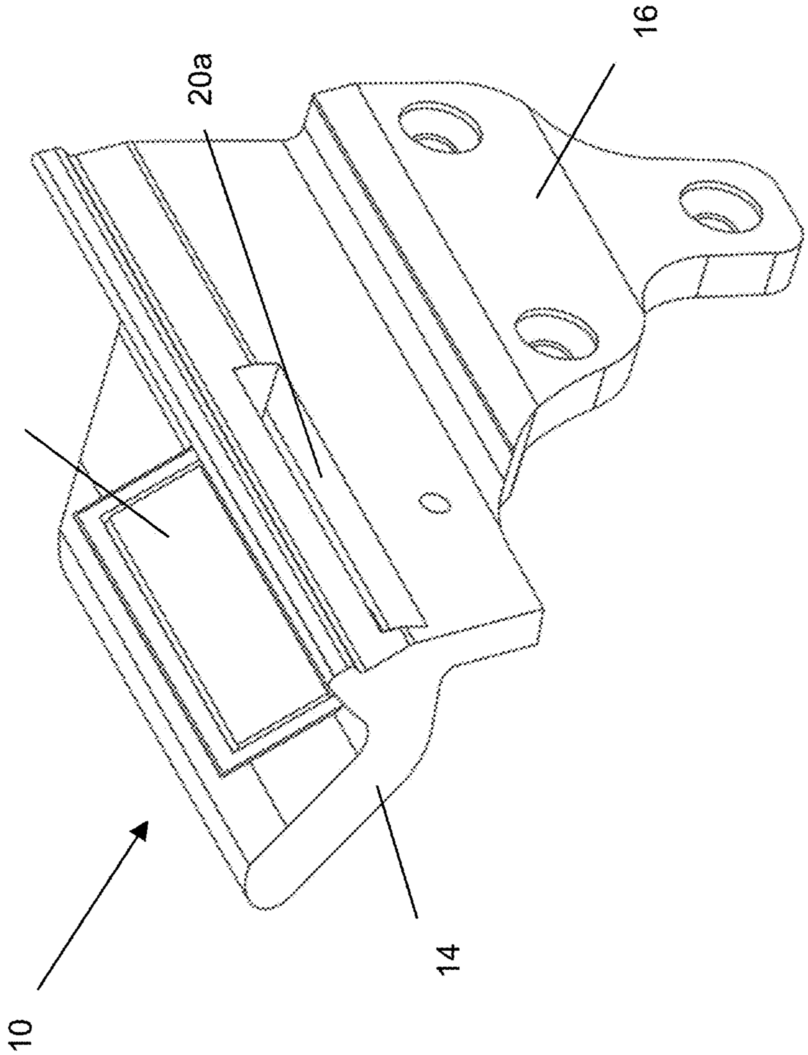
FIG. 2 is a perspective view of the door handle assembly.
Figure 4:
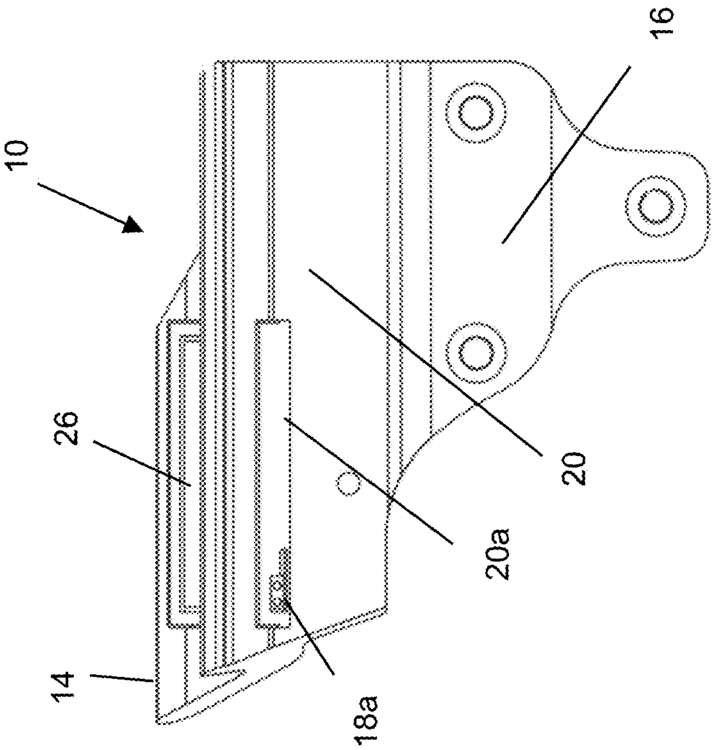
FIG. 4 is an inside plan view of the door handle assembly of FIG. 2.
Figure 3:
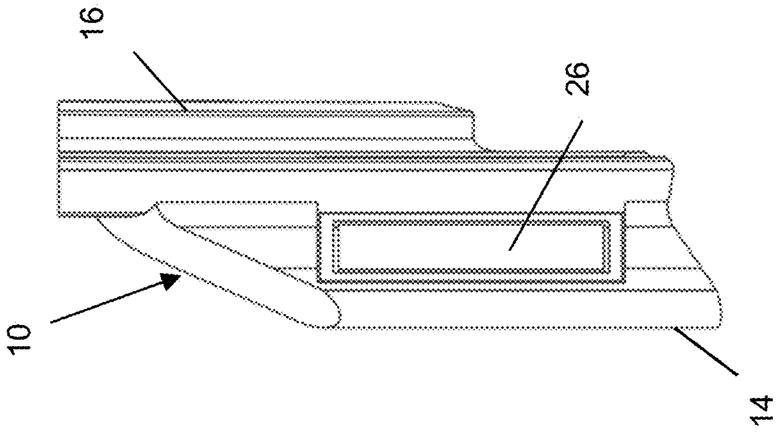
FIG. 3 is a top view of the door handle assembly of FIG. 2.

Referring now to the drawings and the illustrative embodiments depicted therein, a vehicular handle assembly or module or unit 10 is mountable to a door 12*a* of a vehicle 12, and is operable to release a latch mechanism of the vehicle door 12*a* to open the vehicle door 12*a* (FIG. 1). The vehicular handle assembly 10 includes a protruding or extending or handle portion 14 that extends from a base portion or bracket 16 (FIGS. 2-5B) that is mountable to the vehicle door 12*a*, with the handle portion 14 extending outward from the vehicle door 12*a*. The handle assembly 10 includes an electrically operable switch 18 at the handle portion 14 that is actuated when a user grasps the handle portion 14 and squeezes or pulls at the handle portion 14 to actuate the switch 18 for unlatching and/or opening the vehicle door 12*a* and/or the like, as discussed below.

The bracket or base portion 16 is configured to be mounted at the vehicle door 12*a* inboard of an outer panel of the door 12*a*. In the illustrated embodiment, the bracket 16 is configured to be attached at the door 12*a* via a plurality of fasteners that are received through apertures of the bracket 16 and attached (such as threadedly attached) at the door frame.

The handle assembly 10 includes an intermediate portion 20 that extends outward from the bracket 16 and is configured to extend upward from the bracket 16 and along the outer panel of the door 12*a*. The handle portion 14 extends outward from the intermediate portion 20 so as to protrude outboard from the panel of the door 12*a* and to be accessible by a person opening the vehicle door 12*a*. The outer surface of the intermediate portion 20 and the handle portion 14 may comprise a cosmetic surface or finish that may match the surface or finish of the door panel.

Figure 5A:
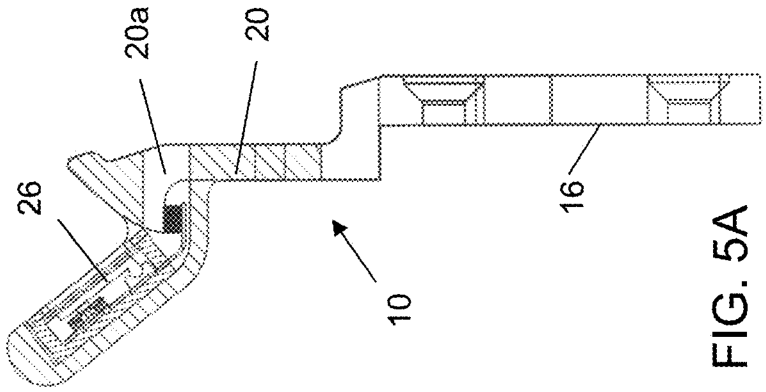
FIG. 5A is a sectional view of the door handle assembly of FIG. 5.
Figure 5:
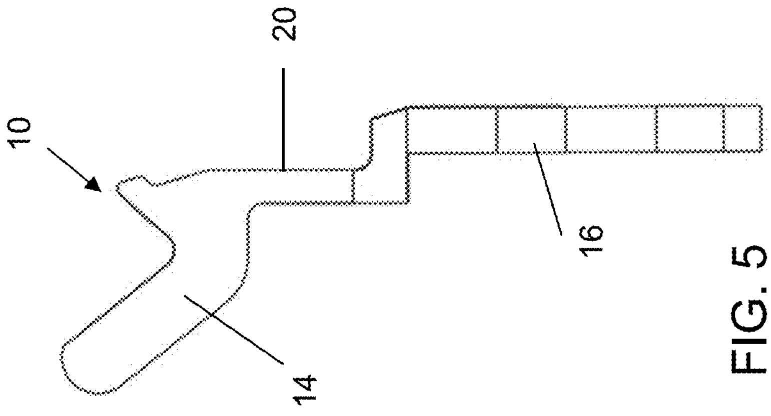
FIG. 5 is an end view of the door handle assembly of FIG. 2.
Figure 5B:
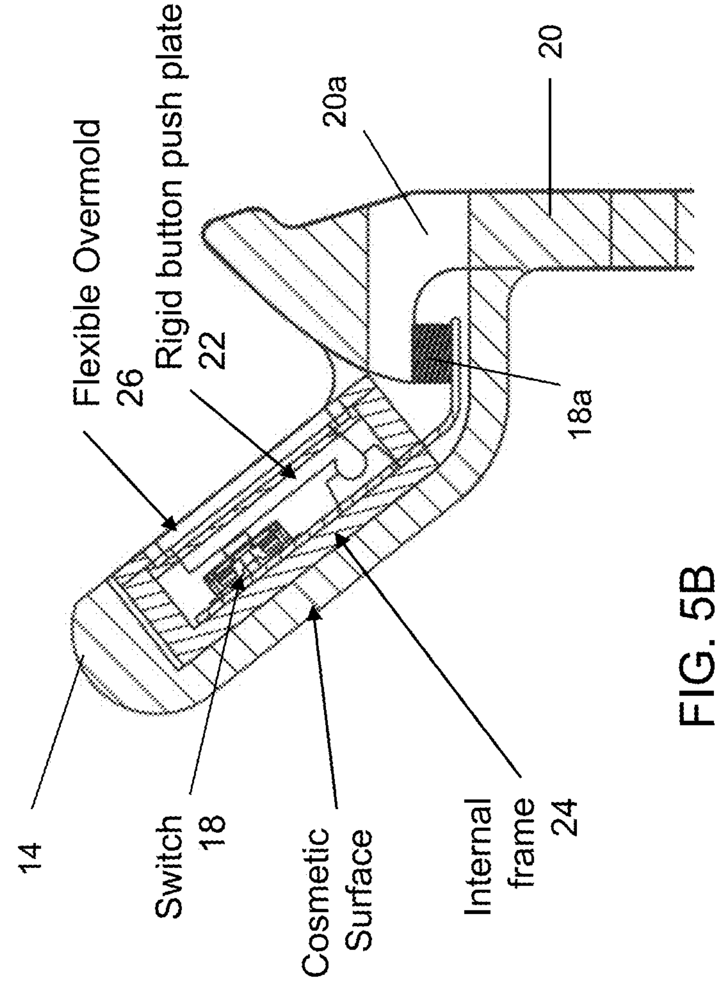
FIG. 5B is an enlarged view of a portion of the sectional view of the door handle assembly of FIG. 5A.
Figure 6:
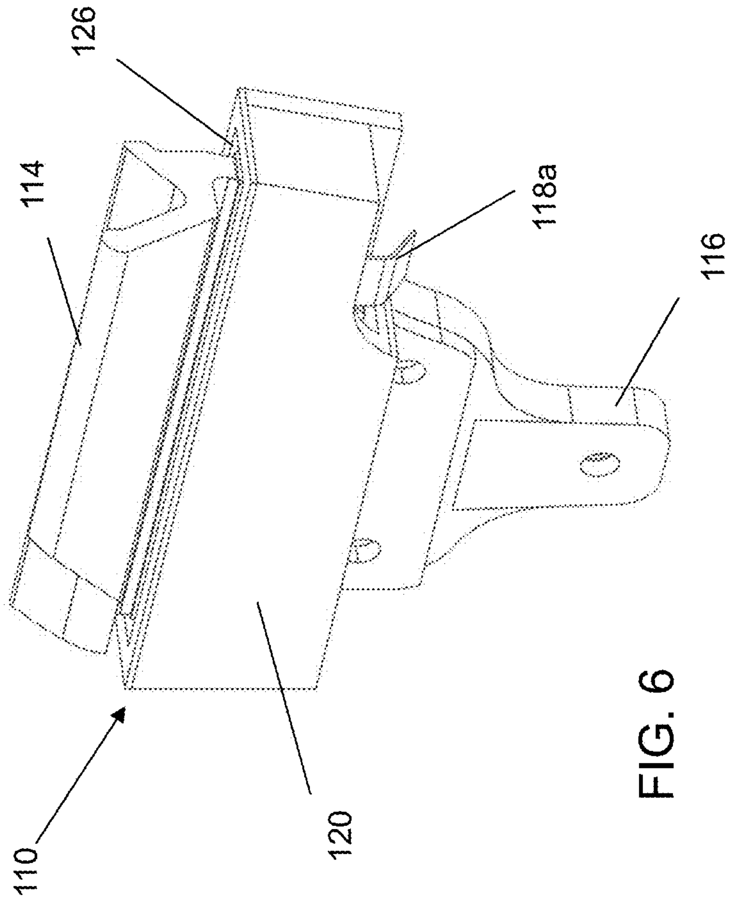
FIG. 6 is a perspective view of another door handle assembly.
Figure 8:
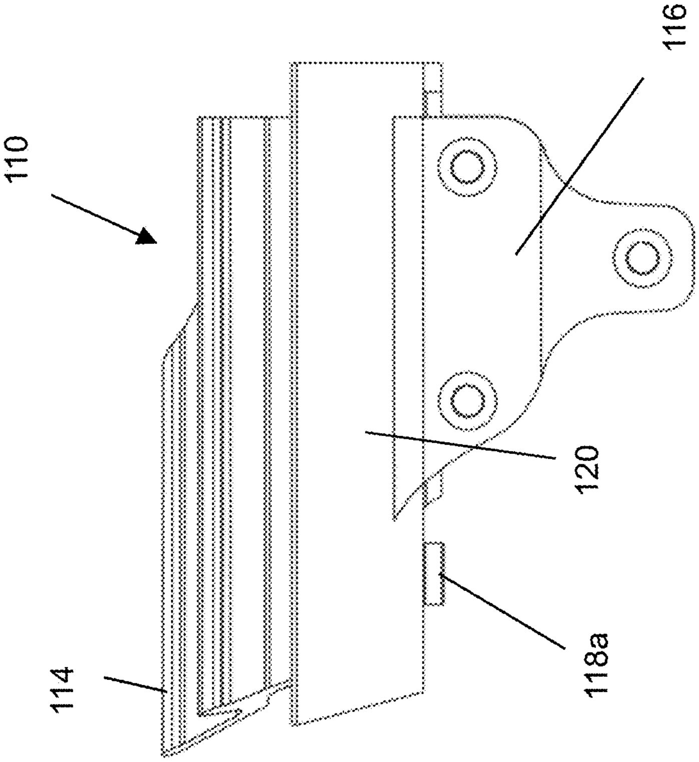
FIG. 8 is an inside plan view of the door handle assembly of FIG. 6.
Figure 7:
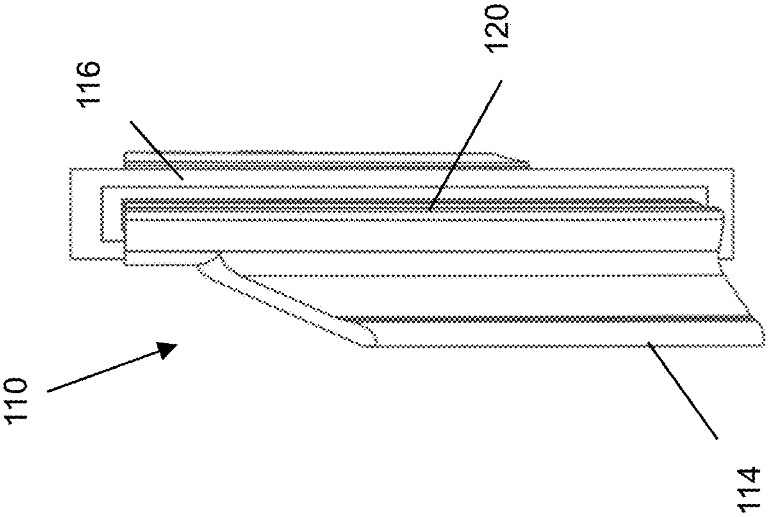
FIG. 7 is a top view of the door handle assembly of FIG. 6.

As shown in FIG. 5B, the handle portion 14 includes a movable plate or push plate 22 that is pivotally or movable disposed at the handle portion 14 and that is pivoted or moved when a user grasps or pulls at the handle portion 14. The switch 18 is disposed within the handle portion 14 and is actuated when the push plate 22 is moved inward into the handle portion 14. The switch 18 has an electrical connector 18*a* that is routed along the handle portion 14 and into a passageway 20*a* of the intermediate portion for electrical connection to a wire harness or connector of the vehicle door 12*a* when the handle assembly 10 is mounted at the vehicle door 12*a*.

In the illustrated embodiment, the switch and push plate 22 are mounted at an internal frame 24 that is disposed in the handle portion 14. A flexible overmold or membrane or element 26 is disposed at the frame and at and over the push plate 22 and forms part of the exposed surface of the handle portion 14. Thus, when a user grasps at or pulls at the handle portion 14, pressure or force applied at the flexible overmold 26 flexes the overmold and pivots or moves the push plate to actuate the switch.

Thus, the door handle assembly 10 provides a fixed handle portion with the actuating mechanism and switch module contained entirely within the handle portion. The switch module is thus fully integrated into the protruding handle portion 14, such that a user physically touches or pushes or pulls at the switch pad or flexible overmold to open the vehicle door 12*a*.

Optionally, the handle portion 14 may comprise a movable or pivotable handle portion that moves or pivots relative to a structural portion of the handle assembly 10, such that the handle portion 14 moves to actuate the switch 18, and the electronics remain inside the vehicle door 12*a*. The switch module is thus integrated inside the door 12*a* and allows for movement (enough to trigger the switch) of the handle structure (hinged inside the door close to the beltline) to actuate the switch 18. This allows for a thin styling/structure in the part that actually protrudes from the beltline of the vehicle door 12*a*, with the switch module integrated in the door handle assembly 10 and located within the vehicle door 12*a*.

For example, and such as shown in FIGS. 6-9B, a vehicular handle assembly 110 includes a protruding or extending or handle portion 114 that extends from a base portion or bracket 116 that is mountable to the vehicle door 12*a*, with the handle portion 114 extending outward from the vehicle door 12*a*. The handle assembly 110 includes an electrically operable switch 118 at the base portion 116 that is actuated when a user grasps the handle portion 114 and pulls the handle portion 114 to actuate the switch 118 for unlatching and/or opening the vehicle door 12*a* and/or the like.

The bracket or base portion 116 is configured to be mounted at the vehicle door 12*a* inboard of an outer panel of the door 12*a*. In the illustrated embodiment, the bracket 116 is configured to be attached at the door 12*a* via a plurality of fasteners that are received through apertures of the bracket 116 and attached (such as threadedly attached) at the door frame.

The handle assembly 110 includes a structural portion 120 that extends outward from the bracket 116 and is configured to extend upward from the bracket 116 and along the outer panel of the door 12*a*. The handle portion 114 is pivotally or movably mounted at and extends upward and outward from the structural portion so as to protrude outboard from the panel of the door 12*a* and to be accessible by a person opening the vehicle door 12*a*. The outer surface of the structural portion 120 and the outer surface of the handle portion 114 may comprise a cosmetic surface or finish that may match the surface or finish of the door panel.

Figure 9A:
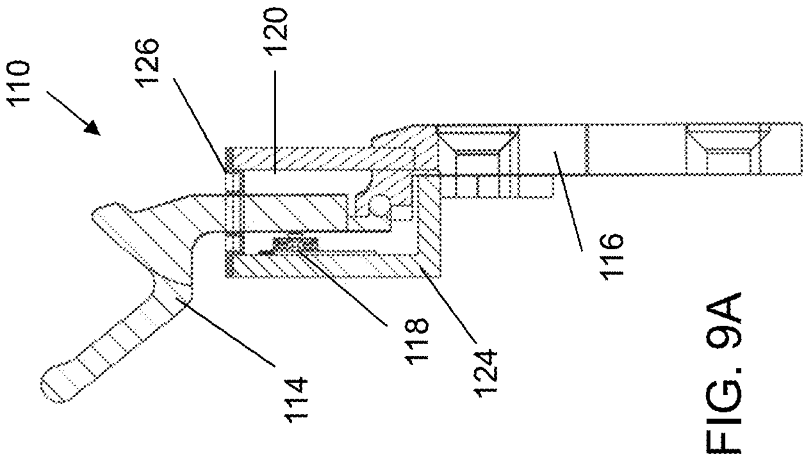
FIG. 9A is a sectional view of the door handle assembly of FIG. 9.
Figure 9:
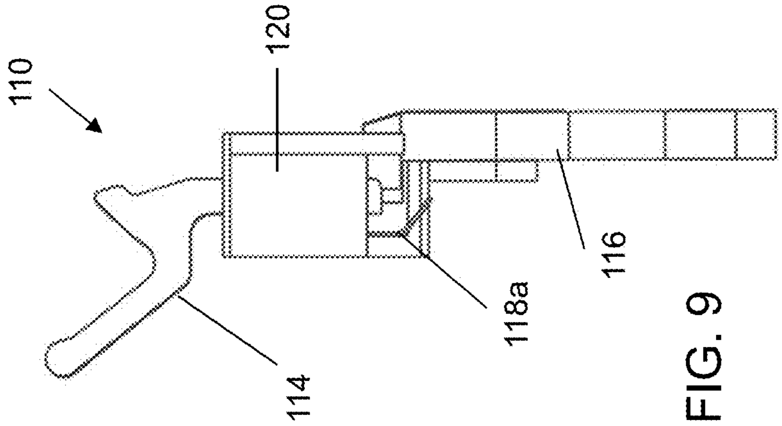
FIG. 9 is an end view of the door handle assembly of FIG. 6.
Figure 9B:
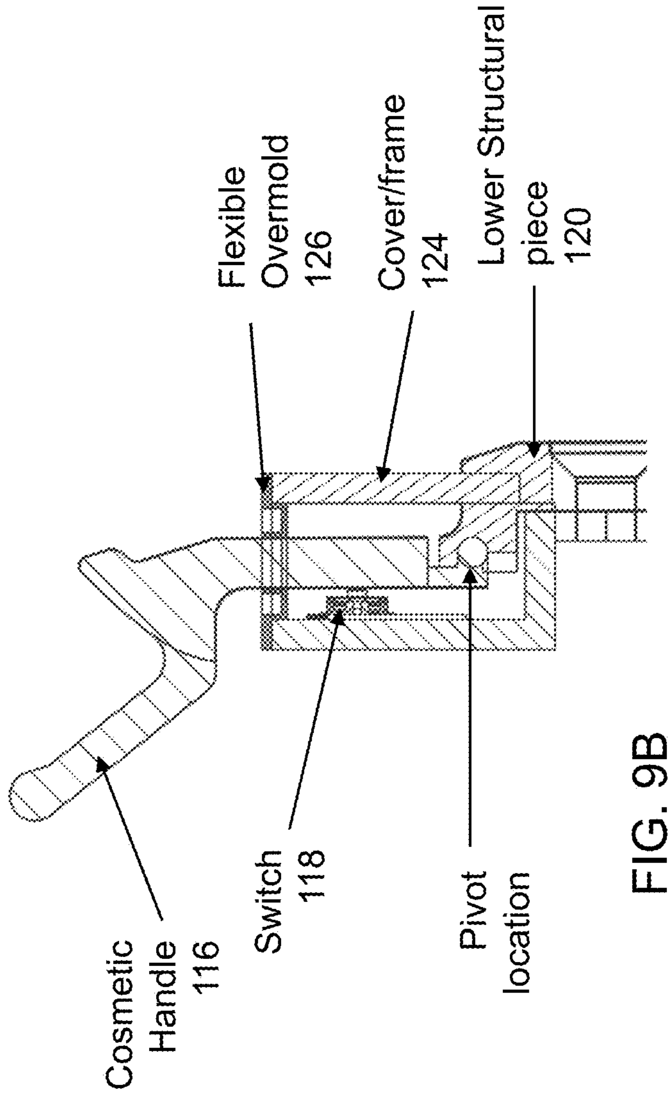
FIG. 9B is an enlarged view of a portion of the sectional view of the door handle assembly of FIG. 9A.

As shown in FIG. 9B, the handle portion 114 is pivotally or movably disposed at the structural portion 120 and is pivoted or moved when a user grasps or pulls at the handle portion 114. The switch 118 is disposed within the structural portion 120 and is actuated when the handle portion 114 is moved. The switch 118 has an electrical connector 118*a* that is routed along the structural portion 120 for electrical connection to a wire harness or connector of the vehicle door 12*a* when the handle assembly 110 is mounted at the vehicle door 12*a*.

In the illustrated embodiment, the switch and handle portion are mounted at an internal frame 124 of the structural portion 120. A flexible overmold or membrane or element 126 is disposed at the frame and around the portion of the handle portion 114 that extends from the structural portion 120. The flexible overmold 126 may form part of the exposed surface of the handle assembly 110 at the vehicle door 12*a* (at an upper end of the structural portion 120 with the handle portion 114 extending through an aperture of the flexible overmold or seal or grommet 126). Thus, when a user grasps at or pulls at the handle portion 114, the handle moves or pivots and pressure or force is applied at the switch to actuate the switch 118. The handle assembly 110 thus has an upper moving portion and a lower structural portion. The upper moving portion or handle portion moves to actuate the switch 118 and allows all electronics to be integrated into the door handle assembly 110 and to be within or inside the vehicle door 12*a*.

Figure 10:
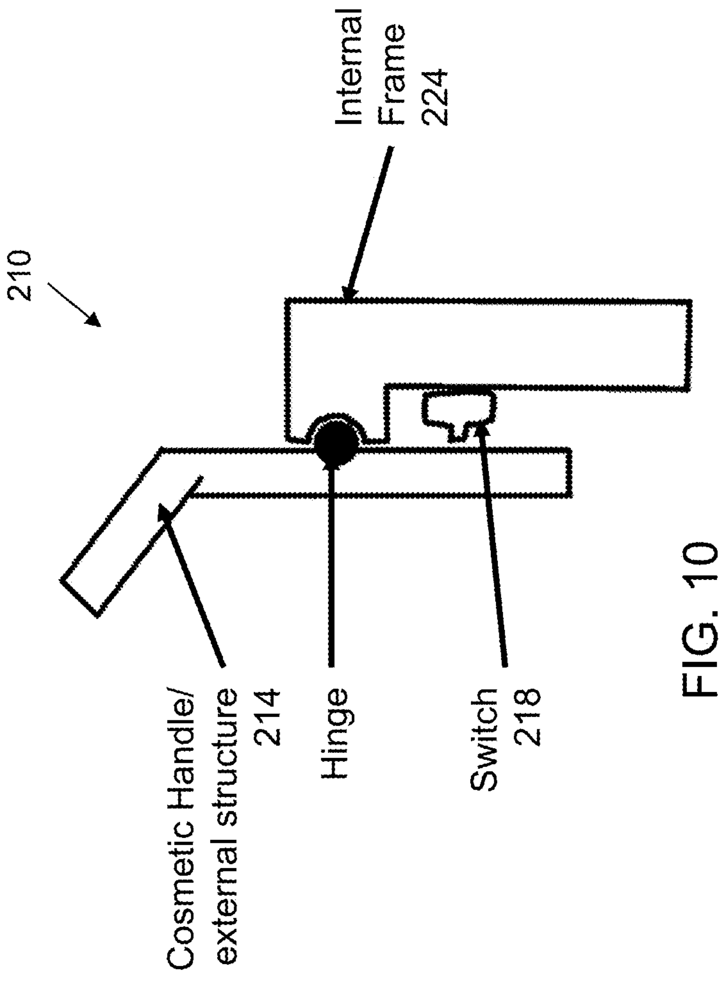
FIG. 10 is a schematic view of another door handle assembly.

Although shown and described as having the pivot axis of the handle portion 114 at a lower end of the handle portion 114 and below the switch 118, the handle portion 114 may pivotally attach at the frame portion via a hinge or pivot joint that is above the switch 118. For example, and such as shown in FIG. 10, a vehicular door handle assembly 210 has a handle portion 214 that is pivotally attached at a frame portion 224, such that outward movement (via pulling by a user at the handle portion of the door) causes inward movement of a lower end of the handle portion 214 to actuate the switch 218 disposed at the internal frame. Thus, the handle assembly 210 has the switch 218 at a location or position towards the inside of the vehicle door 12*a*, which may allow more room for packaging. The handle assembly 210 may otherwise be similar to the handle assembly 110, discussed above.

Figure 11A:
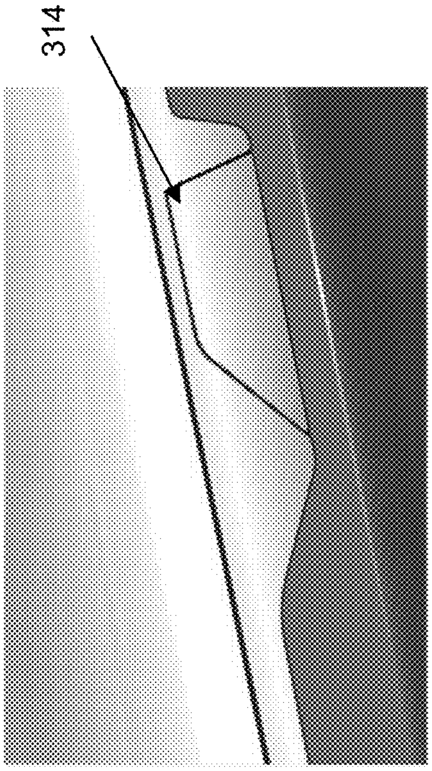
FIGS. 11A and 11B are perspective views of an extendable and retractable door handle assembly.
Figure 11B:
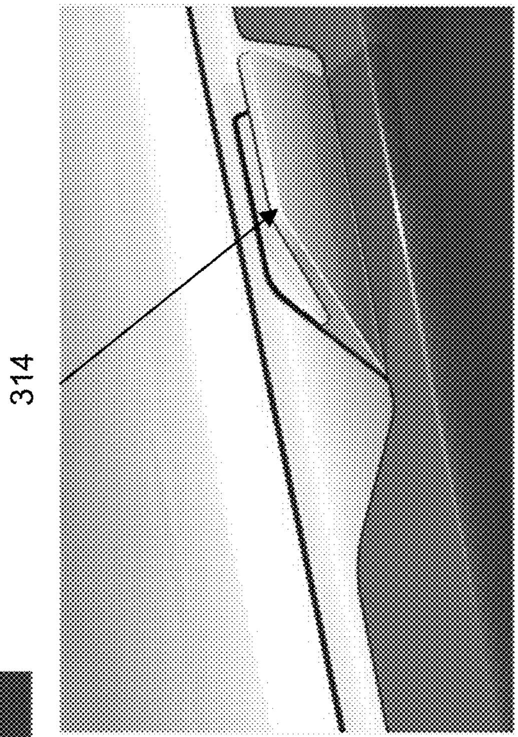
Figure 12B:
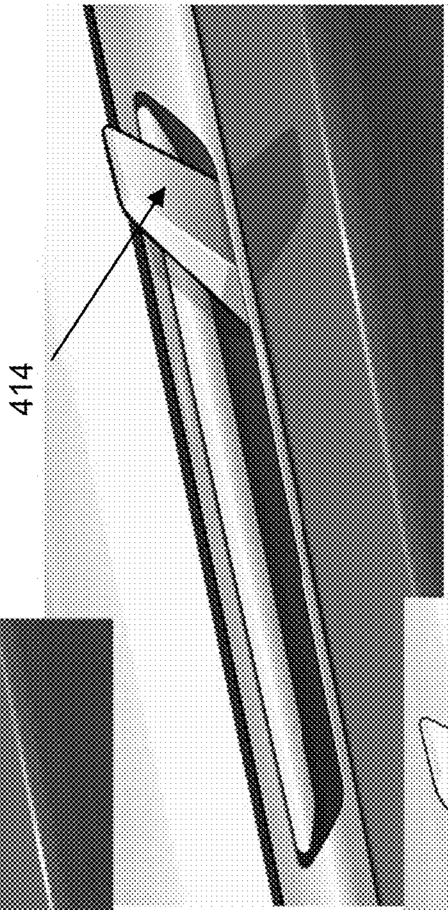
FIGS. 12A-12C are perspective views of another extendable and retractable door handle assembly
Figure 12A:
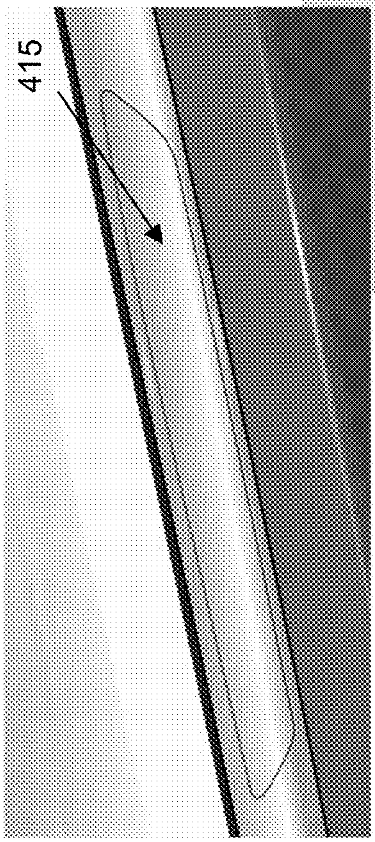
Figure 12C:
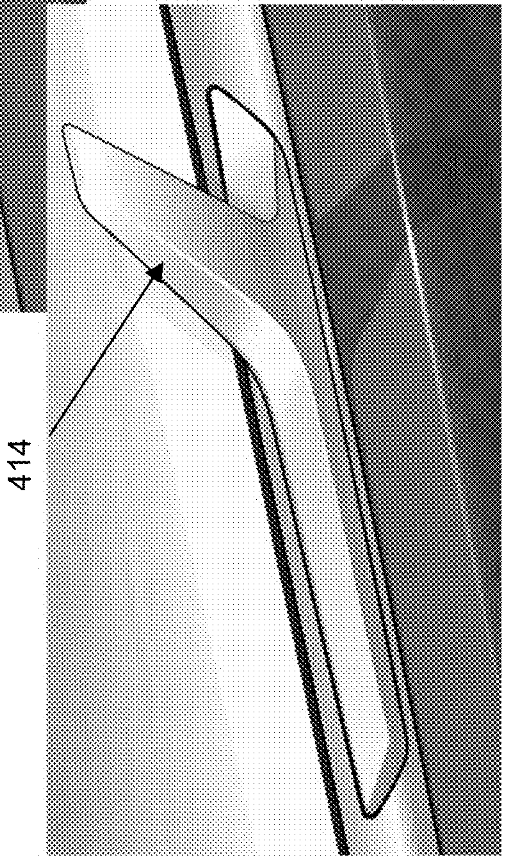
Figure 13:
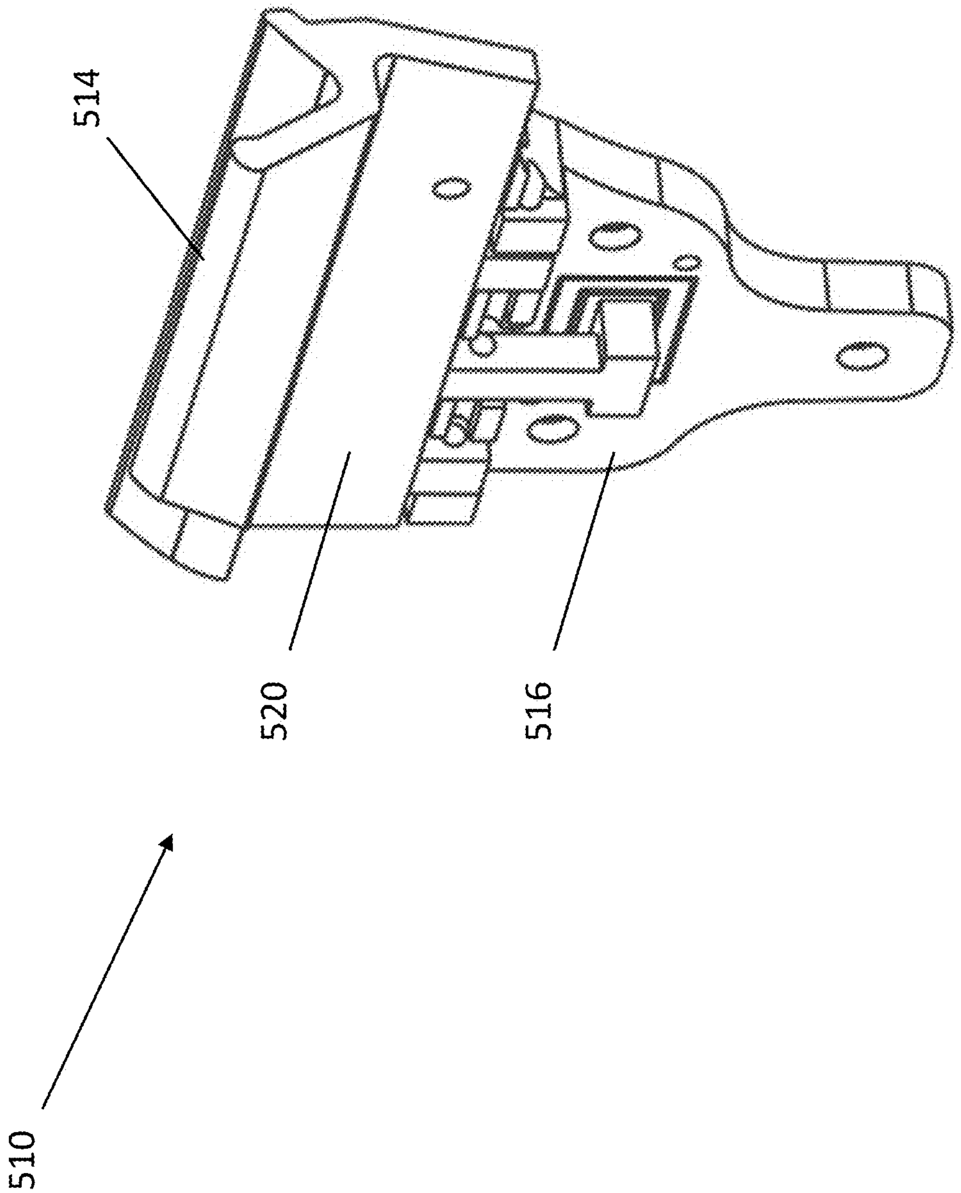
FIG. 13 is a perspective view of another door handle assembly.
Figure 14:
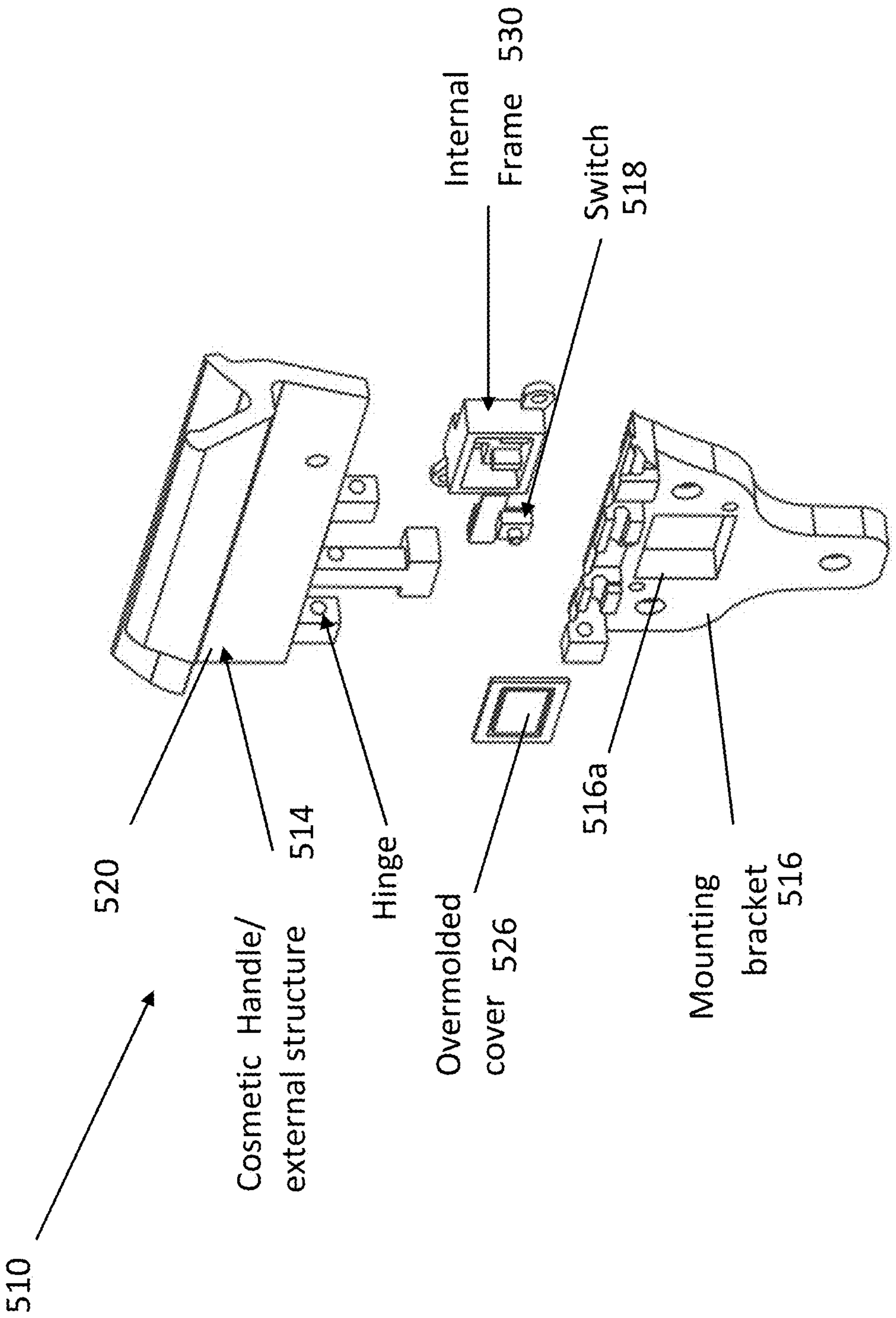
FIG. 14 is an exploded view of the door handle assembly of FIG. 13.
Figure 15:
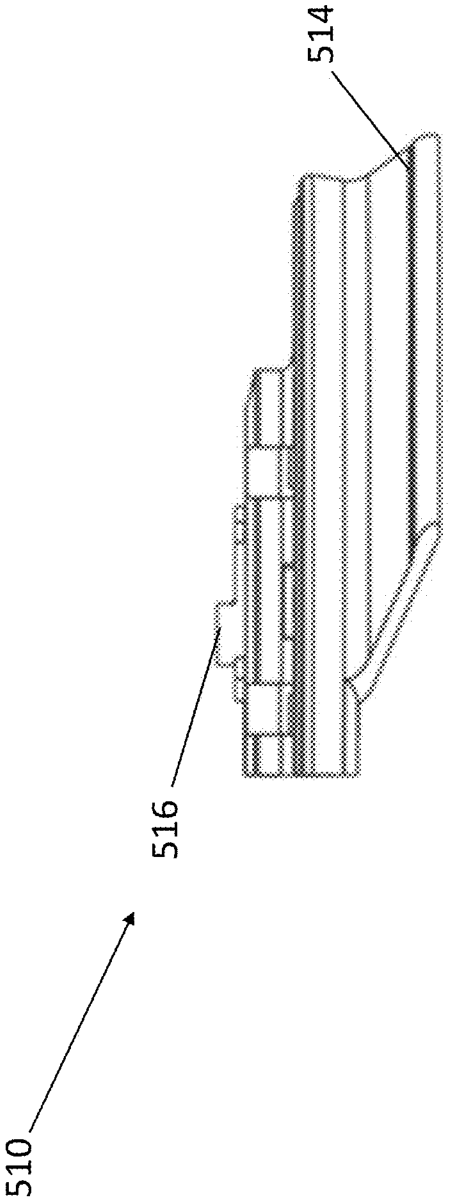
FIG. 15 is a top view of the door handle assembly of FIG. 13.
Figure 16:
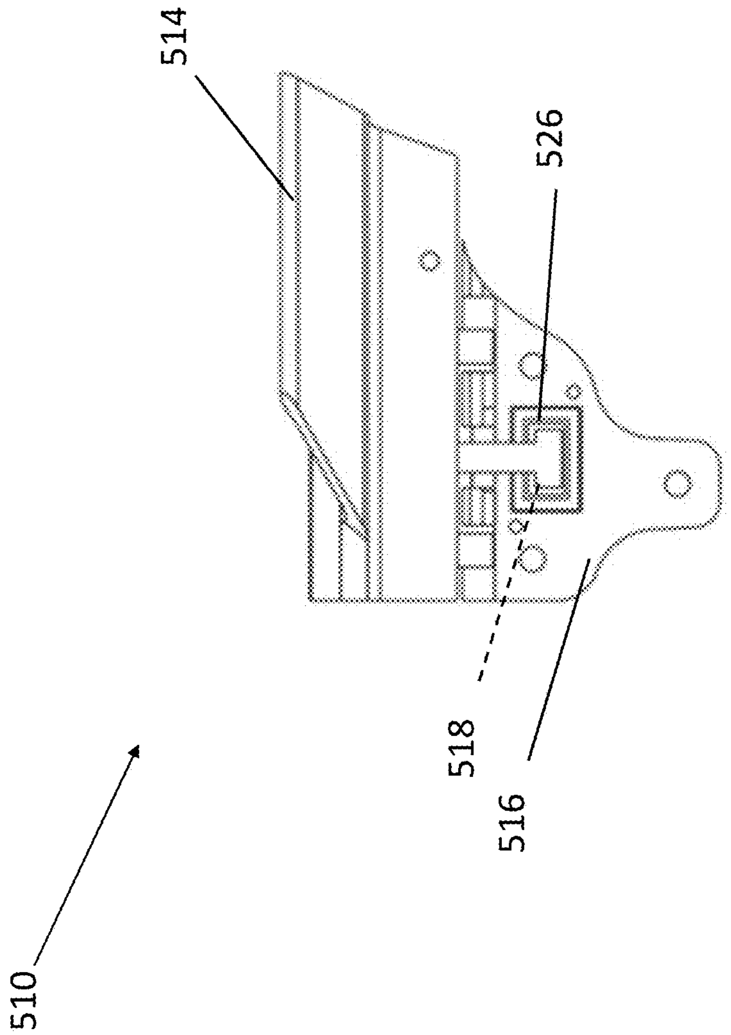
FIG. 16 is an inside plan view of the door handle assembly of FIG. 13.

Although shown and described as having non-recessed or non-extendable/non-retractable handle portions, it is envisioned that aspects of the handle assemblies described herein may be suitable for use in extendable and retractable handle assemblies, where an outer surface of the handle portion is generally flush or coplanar with the vehicle door panel when the handle portion is retracted. For example, the handle portion 314 may be pivotally extended/retracted such as shown in FIGS. 11A and 11B. Optionally, for example, the handle portion 414 may be movable extended/retracted, where a cover plate 415 may be in place when the handle is retracted and the cover plate is moved when the handle is extended, such as shown in FIGS. 12A-12C.

Figure 17:
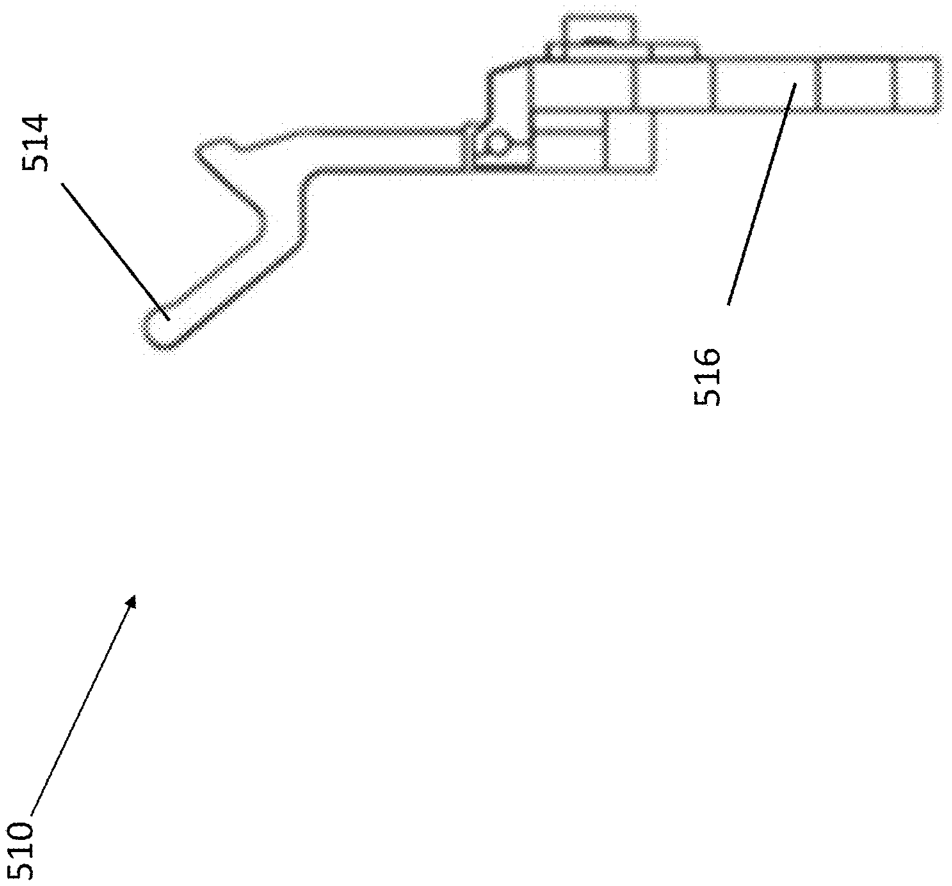
FIG. 17 is an end view of the door handle assembly of FIG. 13.
Figure 18:
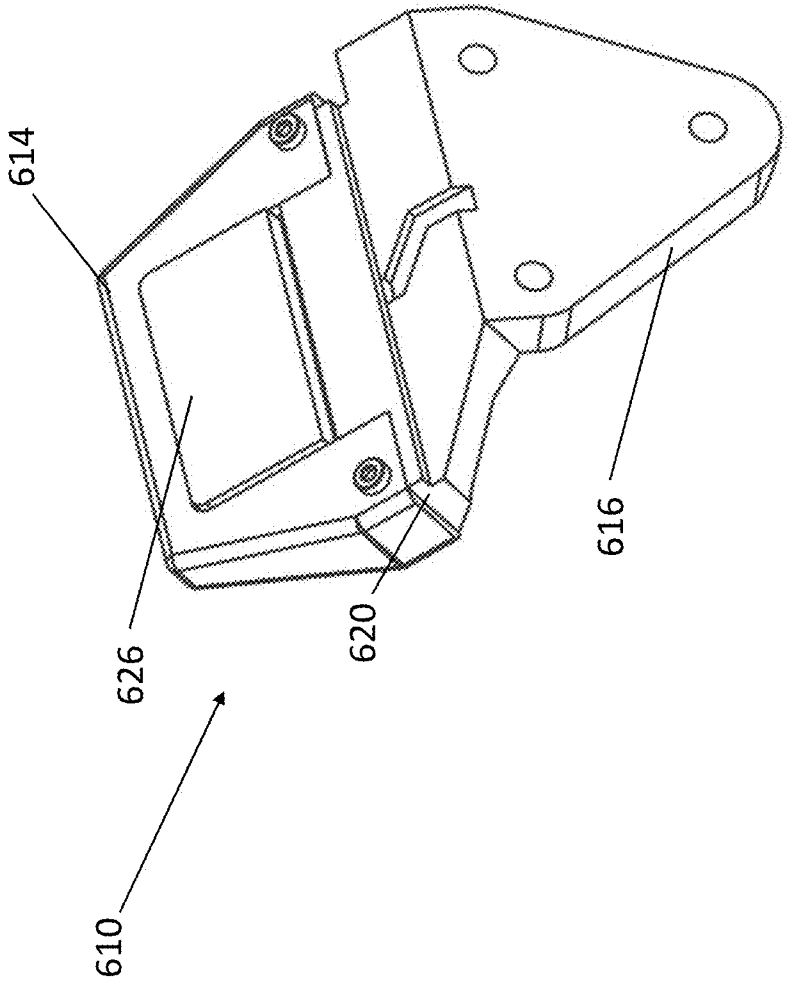
FIG. 18 is a perspective view of another door handle assembly.

Referring to FIGS. 13-17, a vehicular handle assembly 510 includes a protruding or extending or handle portion 514 that extends from a base portion or bracket 516 that is mountable to the vehicle door 12*a*. The handle assembly 510 includes an electrically operable switch 518 at the base portion 516 that is actuated when a user grasps the handle portion 514 and pulls the handle portion 514 to actuate the switch 518 for unlatching and/or opening the vehicle door 12*a* and/or the like. As shown in FIG. 17, the handle portion 514 is pivotally or movably disposed at the structural portion and is pivoted or moved when a user grasps or pulls at the handle portion 514. The switch 518 is disposed within an aperture 516*a* of the bracket 516 and positioned towards the inside of the vehicle. The switch 518 is received in an internal frame or housing 530, which is attached at the bracket 516 with the switch 518 positioned at an aperture 516*a* of the bracket 516, and a flexible overmold or membrane or element 526 is attached at the housing 530 over the switch 518. The positioning of the switch 518 toward the inside of the vehicle increases the space available for packaging the handle assembly 510. The switch 518 is actuated when the handle portion 514 is moved. When a user grasps at or pulls at the handle portion 514, the handle moves or pivots and pressure or force is applied at the switch to actuate the switch 518. The handle assembly 510 thus has an upper moving portion and a lower structural portion. The upper moving portion or handle portion 514 moves to actuate the switch 518 and allows all electronics to be integrated into the door handle assembly 510 and to be within or inside the vehicle door 12*a*. The switch 518 can thus be moved to a favorable position towards the inside of the vehicle, which allows more room for packaging.

Figure 21:
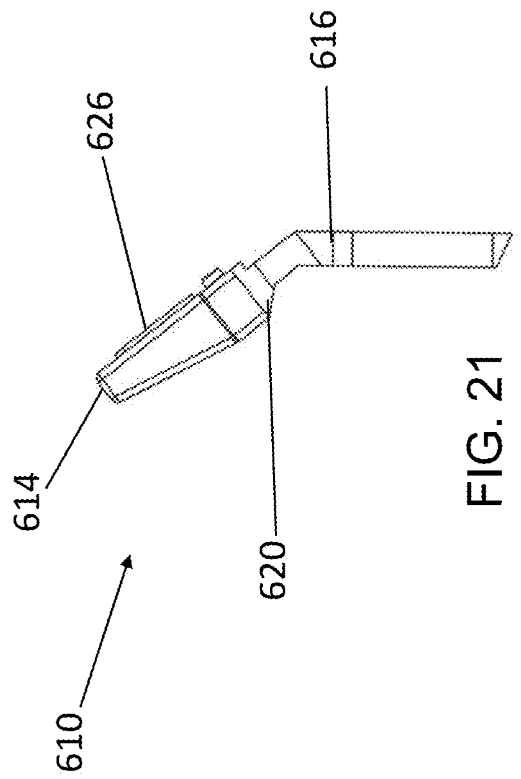
FIG. 21 is an end view of the door handle assembly of FIG. 18.
Figure 21A:
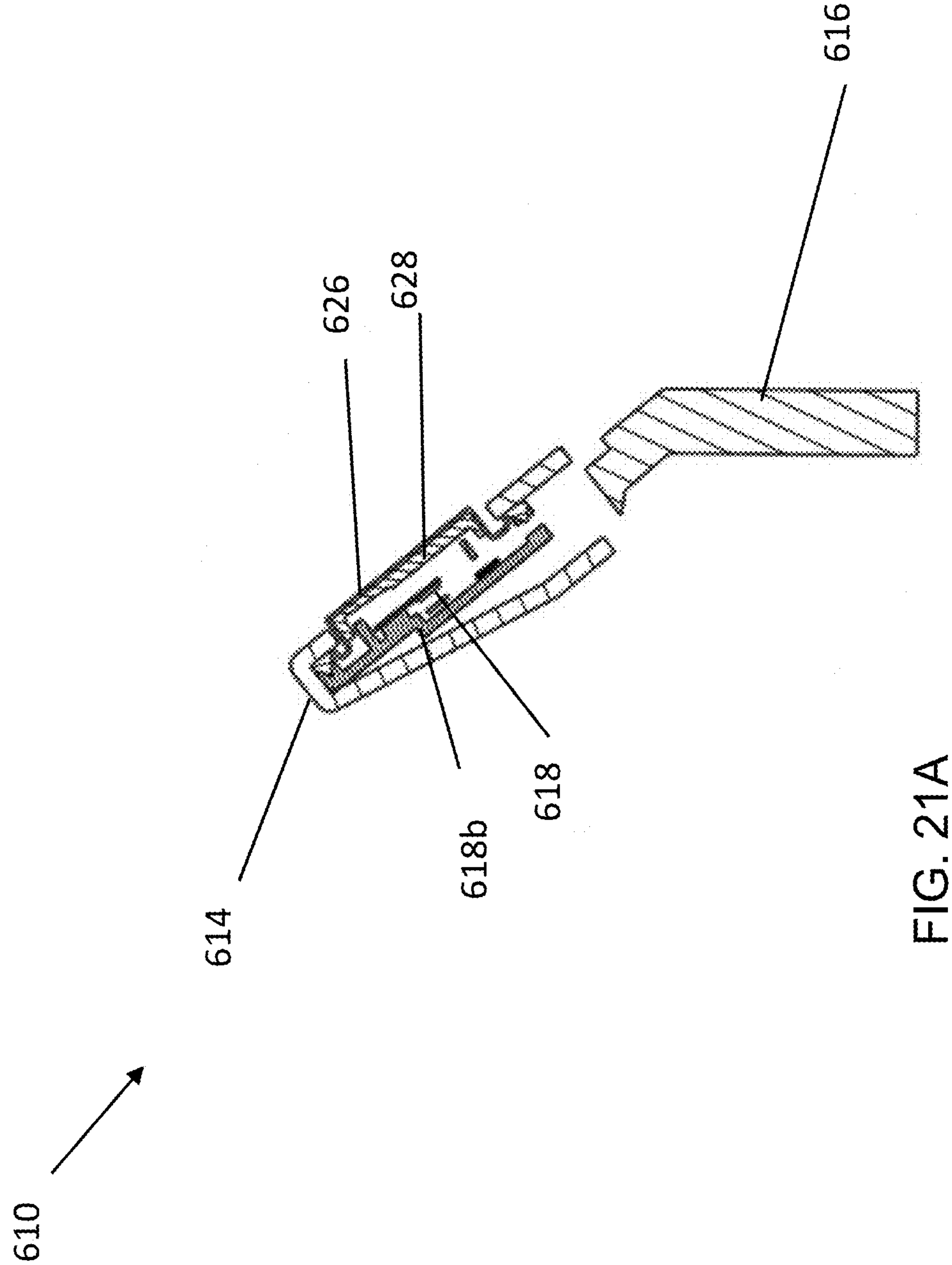
FIG. 21A is a sectional view of the door handle assembly of FIG. 21.
Figure 24:
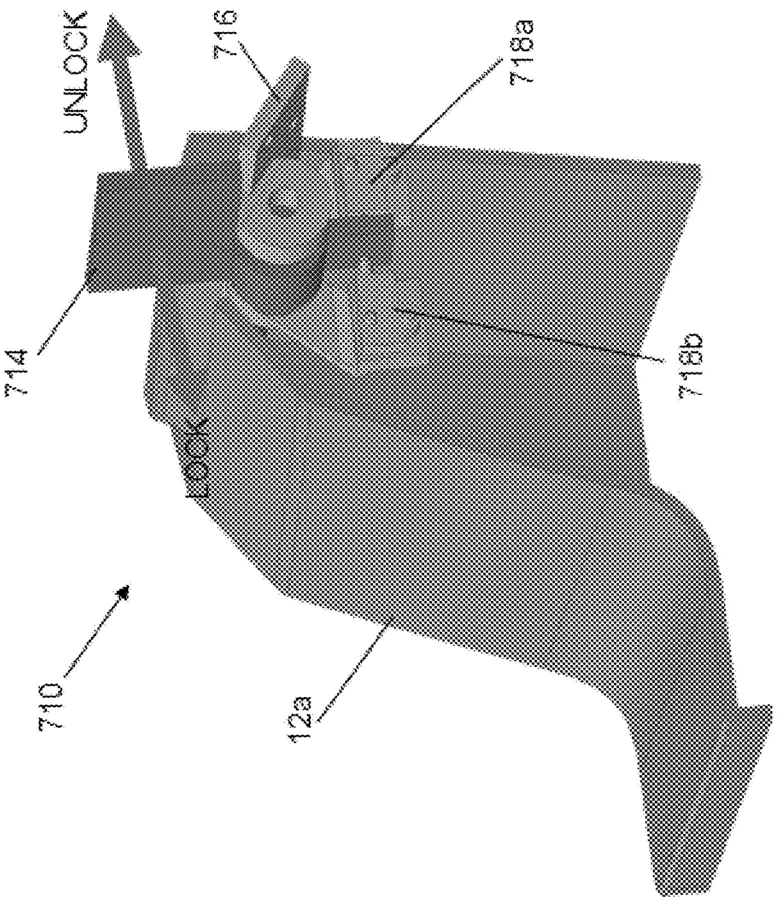
FIG. 24 is a cut away view of the dual action door handle assembly of FIG. 23.
Figure 23:
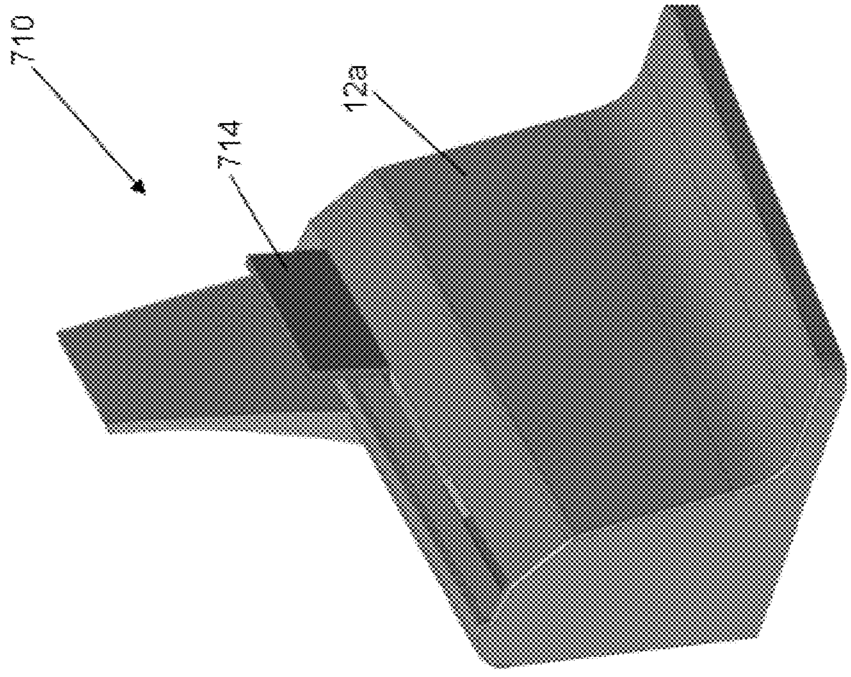
FIG. 23 is a perspective view of a dual action door handle assembly.
Figure 25:
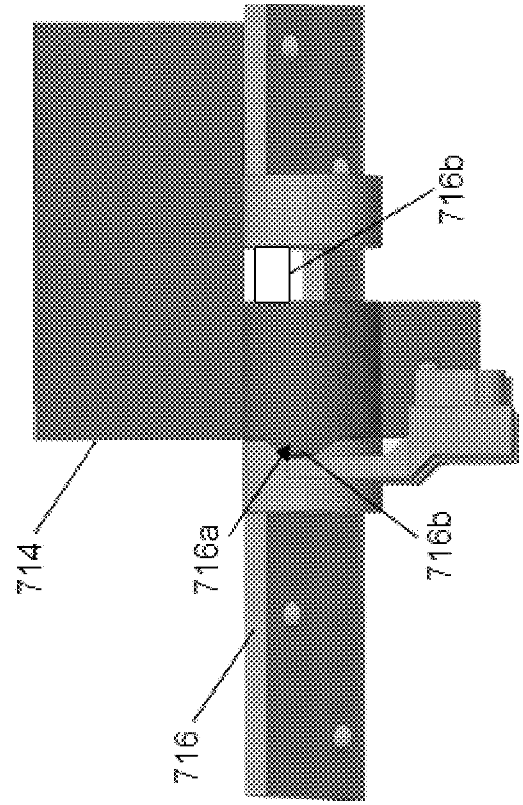
FIG. 25 is a side view of a portion of the dual action door handle assembly of FIG. 23.
Figure 26:
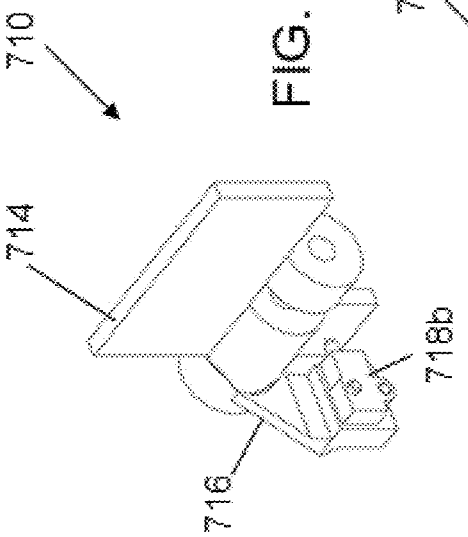
FIG. 26 is another perspective view of the dual action door handle assembly of FIG. 23.
Figure 29:
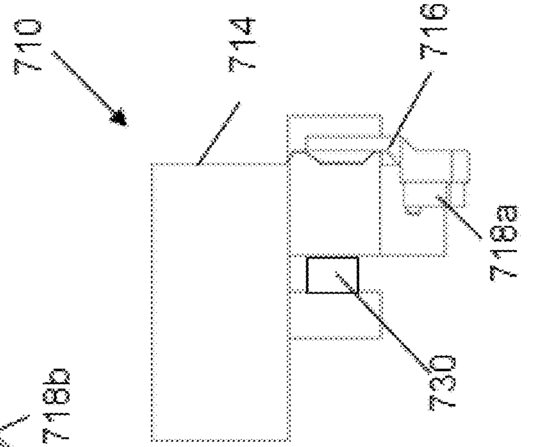
FIG. 29 is a side view of the dual action door handle assembly of FIG. 23.
Figure 27:
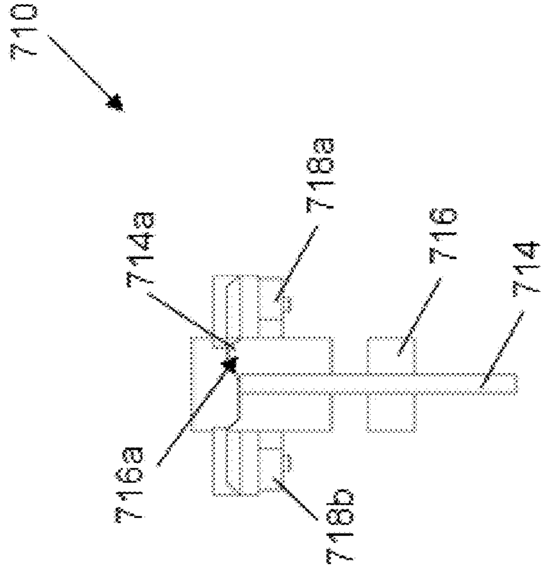
FIG. 27 is a top view of the dual action door handle assembly of FIG. 23.
Figure 28:
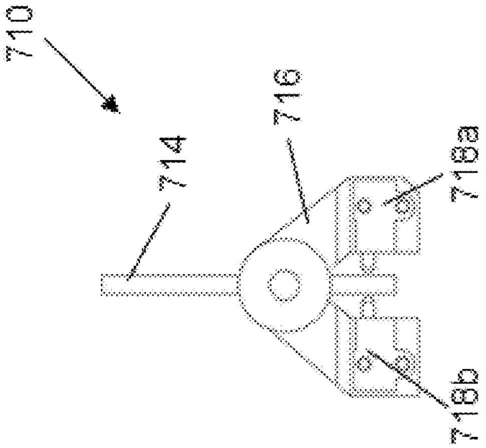
FIG. 28 is an end view of the dual action door handle assembly of FIG. 23.
Figure 30:
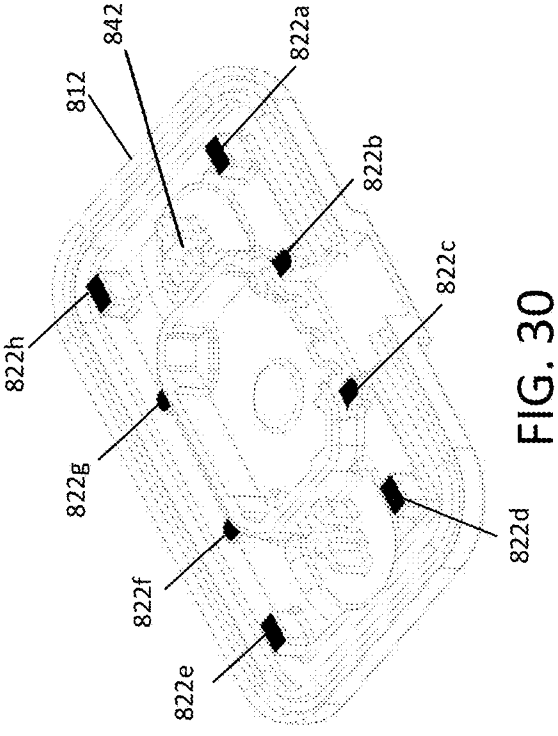
FIG. 30 is a top view of a fixed portion of an electronic module for a door handle assembly.
Figure 31:
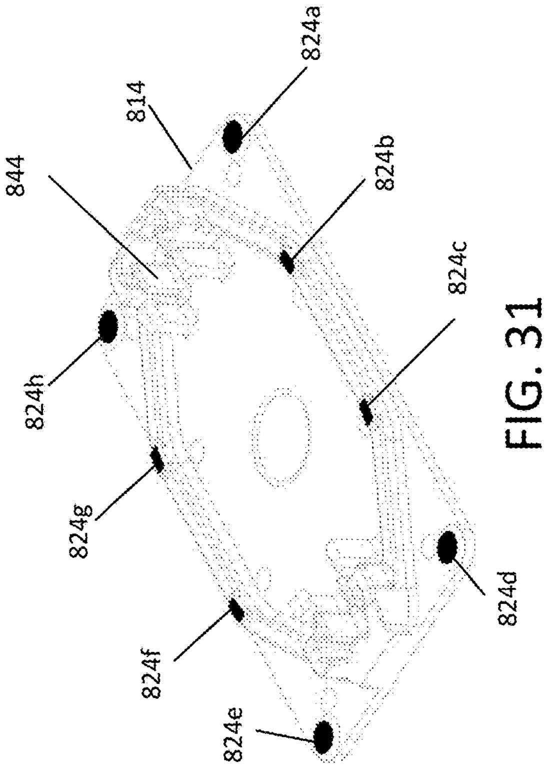
FIG. 31 is a bottom view of a movable portion of an electronic module corresponding to the fixed portion of FIG. 30.

Referring to FIGS. 18-22, another vehicular handle assembly 610 includes a protruding or extending or handle portion 614 that extends from a base portion or bracket 616 that is mountable to the vehicle door 12*a*. The handle assembly 610 includes an electrically operable switch 618 within a structural portion 620 that extends outward from the bracket 616. The switch 618 is actuated when a user grasps the handle portion 614 to unlatch and/or open the vehicle door 12*a*. The handle portion 614 has a cavity 614*a* in which the switch 618 is positioned. As shown in FIG. 21A, the switch 618 is disposed within the structural portion 620 and is actuated when the handle portion 614 is moved. An internal electronic module 618*b* is communicatively coupled to the switch 618 and includes circuitry for unlatching and/or opening the vehicle door 12*a* when the switch 618 is actuated.

Figure 19:
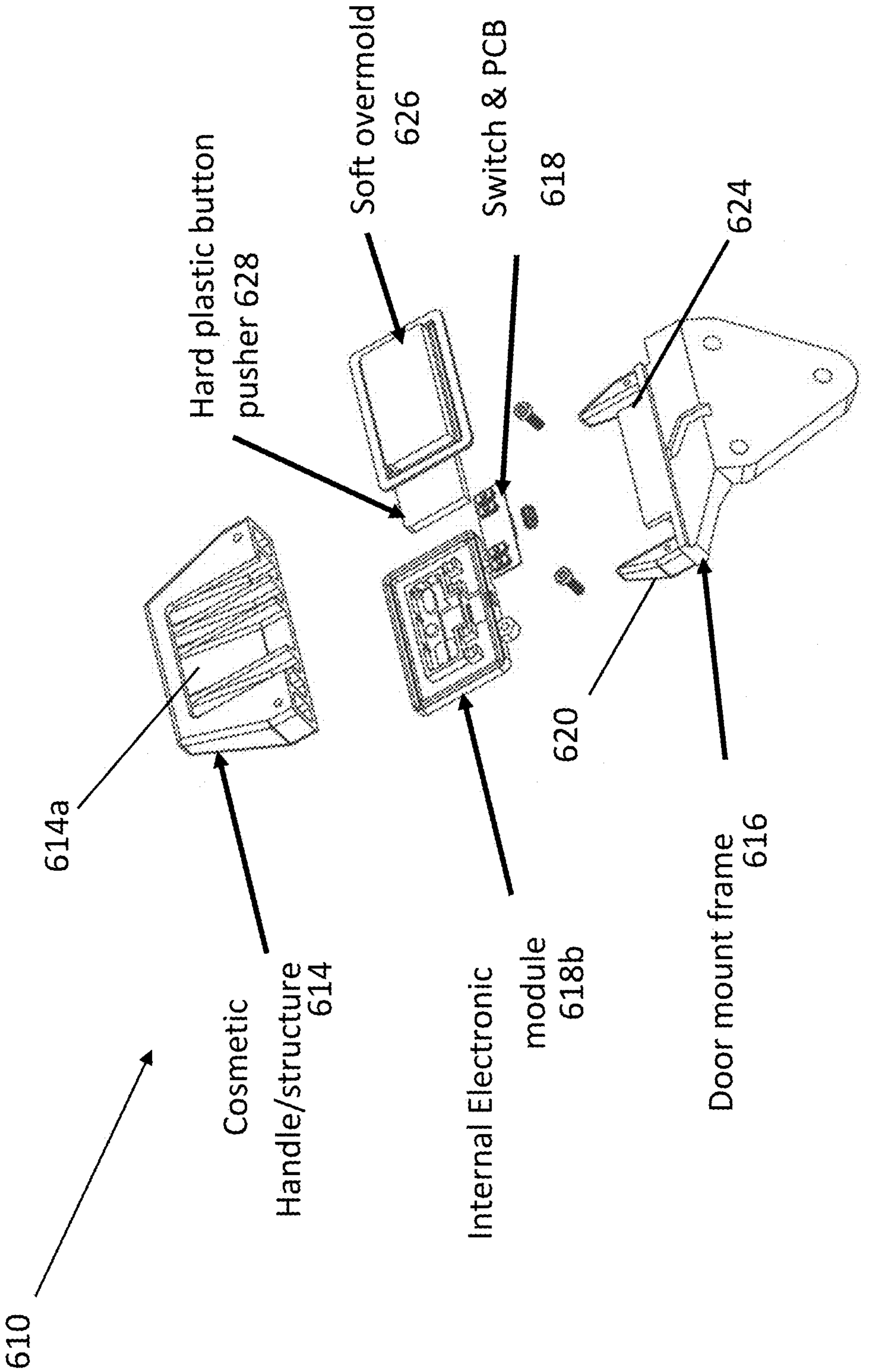
FIG. 19 is an exploded view of the door handle assembly of FIG. 18.
Figure 22:
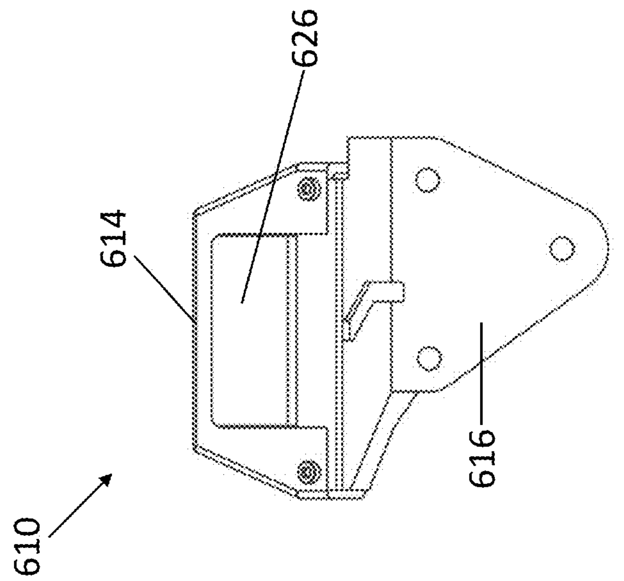
FIG. 22 is an inside plan view of the door handle assembly of FIG. 18.
Figure 20:
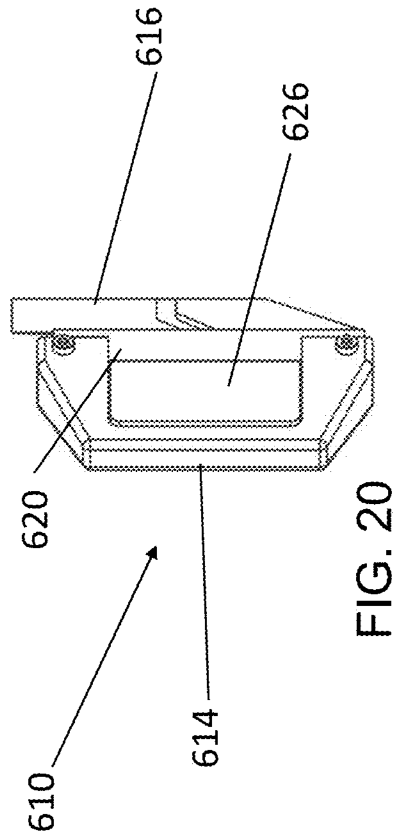
FIG. 20 is a top view of the door handle assembly of FIG. 18.

In the illustrated embodiment, the switch 618 and handle portion 614 are mounted at an internal frame 624 of the structural portion 620. The configuration of the structural portion 620 illustrated in FIGS. 19 and 22 provides a reduced or minimized surface area for packaging and/or forming of the handle assembly 610. In other words, the use of a painted Class A-surface cover or structural portion 620 as a structural part allows for thinner packaging. Accordingly, the switch 618 and electronic module 618*b* are contained within an internal module of the handle assembly 610, which provides modularity for other designs without needing a new electronics design. A flexible overmold or membrane or element 626 is disposed at the frame and over or around the switch 618. An actuator or button or pusher 628 is positioned between the flexible overmold 626 and the switch 618 and is used to actuate or otherwise engage the switch 618 when the handle portion 614 is moved. The flexible overmold 626 may form part of the exposed surface of the handle assembly 610 at the vehicle door 12*a* (at an upper end of the structural portion 620 with the handle portion 614 extending through an aperture of the flexible overmold or seal or grommet 626. Thus, when a user grasps at or pulls at the handle portion 614, the handle moves or pivots and pressure or force is applied at the switch 618 to actuate the switch 618.

Referring to FIGS. 23-29, a dual action vehicular handle assembly 710 includes a protruding or extending handle portion 714 that pivotally extends from a base or structural portion 716 that is mountable to the vehicle door 12*a*. As shown, the handle portion 714 is pivotally disposed at the structural portion 716 and may pivoted or rotated in opposite directions when a user respectively pushes or pulls the handle portion 714. The handle assembly 710 includes electrically operable switches 718*a* and 718*b* that are actuated when a user respectively pulls or pushes the handle portion 714. In particular, when the handle portion 714 is pivoted or rotated in a first direction, the handle portion 714 rotates or pivots and pressure or force is applied at the switch 718*a* to actuate the switch 718*a*. When the handle portion 714 is pivoted or rotated in a second opposite direction, the handle portion 714 rotates or pivots and pressure or force is applied at the switch 718*b* to actuate the switch 718*b*. Thus, the handle portion 714 can be used to perform two different actions, such as actuating a locking mechanism and actuating an unlocking mechanism, and optionally having a function for unlatching the door latch mechanism through use of an e-latch.

As shown, the switches 718*a*, 718*b* are mounted to the structural portion 716. Example switches 718*a*, 718*b* are sealed, snap-action switches. To prevent unintended rotation or pivot of the handle portion 714, the structural portion 716 includes one or more indents or recesses or detent elements 716*b* for engaging one or more detents or protrusions or detent elements 714*a* of the handle portion 714, and a spring 730 that applies a pressure or force to the handle portion 714 to hold the protrusion(s) 714*a* in the indent(s) 716*b* and thus to retain the handle portion 714 in a neutral position until a sufficient rotational force is applied to the handle portion 714. The detent functions to keep the handle portion at the neutral position, and the biasing element or spring (e.g., a coil spring) urges the detent of the handle portion into the recess of the base structure and allows for tuning of the actuation force for different applications or desired resistance to pivoting of the handle portion. The detent function may be provided by each of the handle portion and the structural portion having a plurality of protrusions and recesses that engage one another to limit rotation of the handle portion relative to the structural portion until sufficient force is applied at the handle portion to overcome the spring force and move the protrusions out of the respective recesses.

Optionally, the handle portion may be biased or urged into engagement with one switch so that the neutral position of the handle presses one switch. The user may actuate the handle in one direction to press a second stage of the switch, while actuating in the opposite direction would release the first stage of the switch. Optionally, the detent functions to keep the handle portion at the position that applies a pressure or force at one of the switches to actuate that switch until the handle portion is rotated or pivoted to apply a pressure or force to the other of the switches to actuate the other switch. Alternatively, the detent functions to keep the handle portion at a position that applies a pressure or force at one of the switches that is a dual-action switch to actuate a first stage of that switch until the handle portion is rotated or pivoted in one direction to apply a further pressure or force to that switch to actuate a second stage of that switch, or is rotated or pivoted in an opposite direction to release the first stage of that switch and apply a pressure or force to the other of the switches to actuate the other switch. This configuration allows the switches to be stacked and actuated using a forked handle portion to save space.

FIGS. 30-33 depict an example electronic module 810 that may be used to implement, for example, the movable plate or push plate 22, the switch 18, and the flexible overmold or membrane or element 26 of FIGS. 2-5B. Optionally, the electronic module 810 may be used to implement, for example, the electronic module 618*b* of FIGS. 18-22. The electronic module 810 includes a fixed portion 812, a movable portion 814, a flexible portion 816, and an electrically operable switch 818. The switch 818 is disposed at a cavity or housing or space defined by the fixed portion 812 and the movable portion 814, and is affixed to and extends outward from the fixed portion 812. The switch 818 is actuated when a user applies a sufficient force to the movable portion 814 by, for example, grasping a handle portion of a vehicle door that includes the electronic module 810 to unlatch and/or open the vehicle door.

The electronic module 810 may include circuitry for unlatching and/or opening the vehicle door when the switch 818 is actuated. Alternatively, activation of the switch 818 may be provided to another circuit of the vehicle for unlatching and/or opening the vehicle door when the switch 818 is actuated. The flexible portion 816 includes a flexible overmold or membrane or element at an outer surface of the electronic module 810 and disposed at the movable portion 814. When a sufficient force is applied to the flexible portion 816 by, for example, grasping a handle portion of a vehicle door that includes the electronic module 810 to unlatch and/or open the vehicle door, the flexible portion 816 flexes to move the movable portion 814 to actuate the electronic switch 818. When a force is not being applied to the flexible portion 816, the movable portion 814 is nominally parallel to the fixed portion 812.

Figure 32:
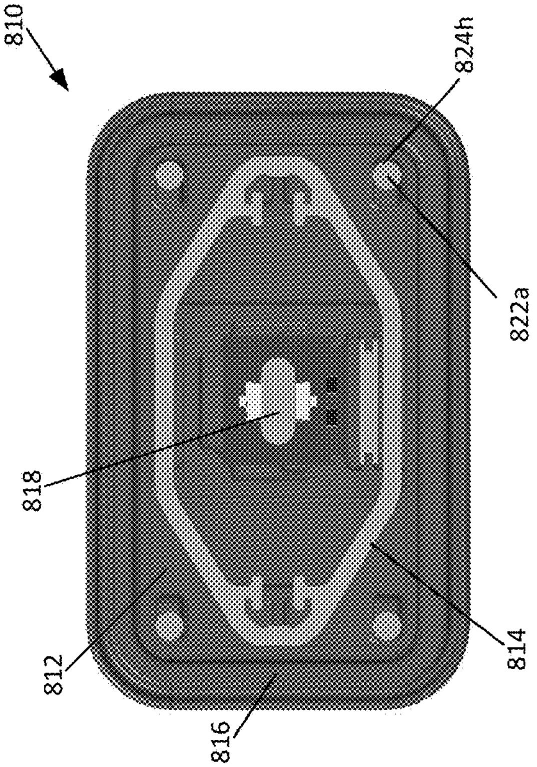
FIG. 32 is a cut away top view of an electronic module for a door handle assembly including the fixed portion of FIG. 30 and the movable portion of FIG. 31.
Figure 33:
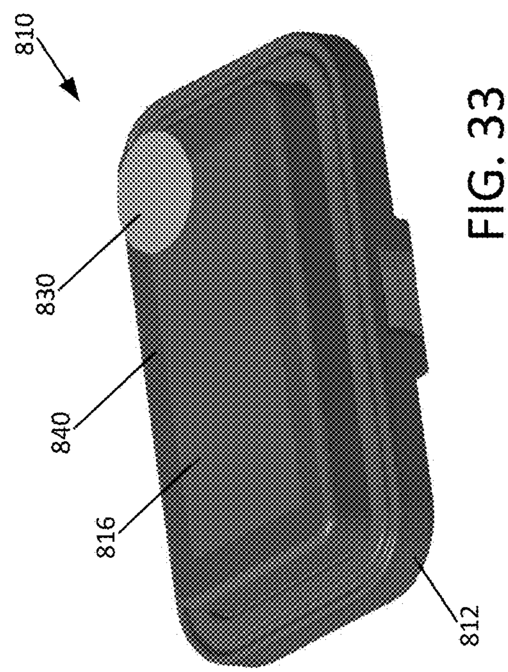
FIG. 33 is a perspective view of the electronic module of FIG. 32.

The fixed portion 812 includes a plurality of movement limiting surfaces 822*a*-*h*. The movable portion 814 also includes a plurality of movement limiting surfaces 824*a*-*h*. While example shapes and numbers of surfaces 822, 824 are shown in FIGS. 30-33, the electronic module 810 may be implemented with other combinations of structure and surfaces 822, 824. As shown in FIG. 32 with overlapping shapes (e.g., for overlapping surfaces 822*a* and 824*b*), the surfaces 824 of the movable portion 814 are disposed opposite corresponding ones of the surfaces 822 of the fixed portion 812. When a user applies a sufficient force to the flexible portion or activation pad 816 near a center of the electronic module 810, the movable portion 814 will move toward the fixed portion 812 while remaining approximately parallel to the fixed portion 812 so that the force activates the switch 818. However, when a user applies an off-center force 830 (e.g., a force that is not at a center of, and/or is not perpendicular to, the movable portion 814 the electronic module 810), for example, along a "deadzone" or perimeter region 840 of the electronic module 810, the off-center force 830 may cause the movable portion 814 to be no longer parallel with the fixed portion 812. When an off center force is applied, one or more of the surfaces 822 may engage corresponding ones of the surfaces 824 to limit a non-parallel movement (e.g., a tilting or tipping or pivoting or rotating movement) of the movable portion 814 relative to the fixed portion 812 so that the off center force (even if applied by a user with a small finger or touch point) can still activate the switch 818. Without the surfaces 822, 824, the movable portion 814 may tilt or tip or pivot or rotate to an extent that the switch 818 is not actuated.

The fixed portion 812 includes T-shaped guide elements 842 and the movable portion 814 includes corresponding guide elements 844 that receive the guide elements 842 therein and guide the movable portion relative to the fixed portion in a direction generally perpendicular to the plane of the activation pad or touch surface or element 816. The guide elements also function to movably attach (such as via snap-attachment) the movable portion to the fixed portion so that the movable portion cannot be readily removed from the fixed portion. Optionally, the element 816 is a plastic cover that moves with the movable portion when pressed or squeezed to actuate the switch, with little flexing or bending of the touch surface or activation pad.

Figure 35:
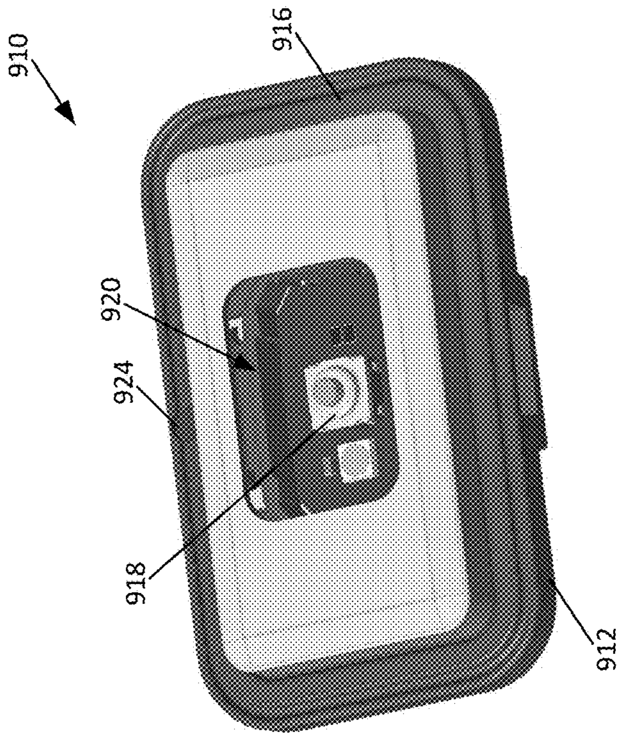
FIG. 35 is a cut away top view of the electronic module of FIG. 34.
Figure 34:
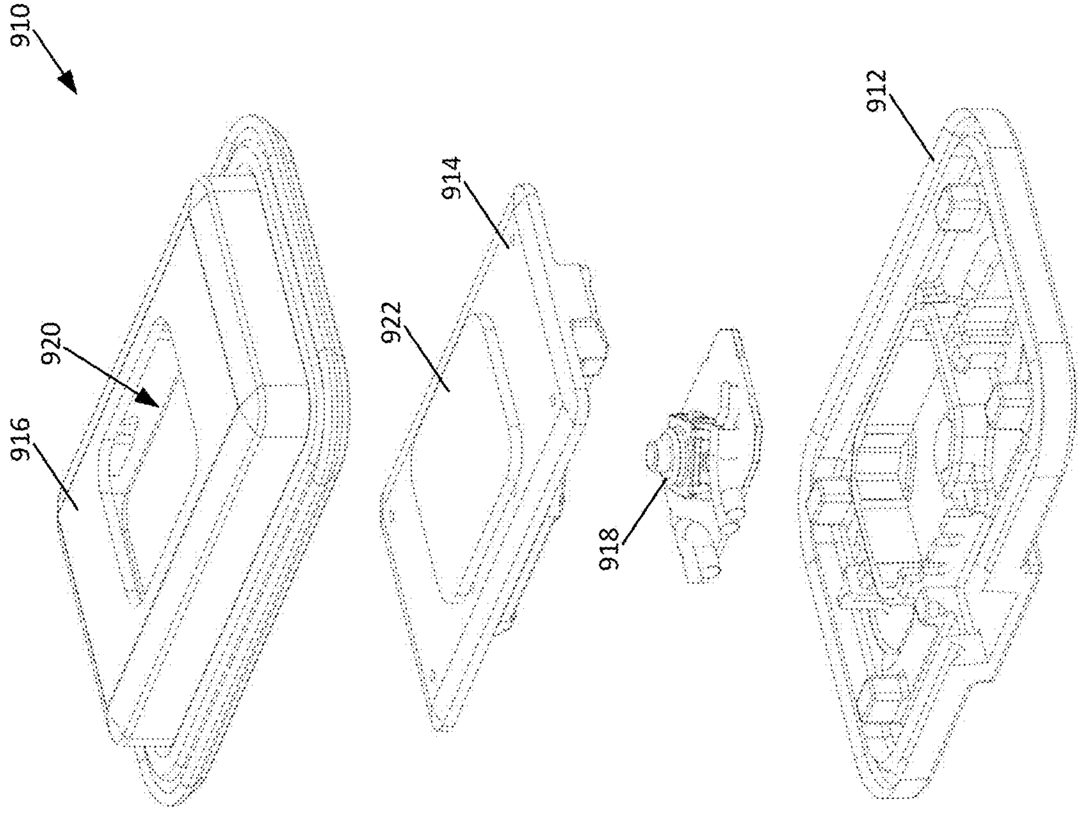
FIG. 34 is an exploded view of another electronic module for a door handle assembly.

FIGS. 34 and 35 depict an example electronic module 910 that may also be used to, for example, implement the movable plate or push plate 22, the switch 18, and the flexible overmold or membrane or element 26 of FIGS. 2-5B or the electronic module 618*b* of FIGS. 18-22. The electronic module 910 includes a fixed portion 912, a movable portion 914, a flexible portion 916, an electrically operable switch 918, and movement limiting surfaces that are similar to those of the electronic module 810 of FIGS. 30-33. However, the flexible portion 916 includes an opening 920 through which an extending portion 922 of the movable portion 914 extends when the electronic module 910 is assembled. In some examples, the extending portion 922 is formed out a material that at least partially passes or transmits light emitted by one or more light emitting diodes 924 of the electronic module 910. For example, at least a portion of the extending portion may be visible light transmissive such that light emitted by the light emitting diode or diodes passes through the visible light transmitting portion so as to be viewable by a person at the door handle. Optionally, the flexible portion may be formed with a transparent or visible light transmissive portion that allows for light emitted by the light emitting diode or diodes to pass through the visible light transmitting portion so as to be viewable by a person at the door handle. Each light emitting diodes 924 may emit one or more colors, and the light emitting diodes 924 need not emit the same color(s). In some examples, the extending portion 922 may, when the light emitting diode(s) 925 are turned on, project a logo or symbol or insignia. For example, the logo or symbol or insignia may be projected on the extending portion 922, or on another portion of a vehicle, such as on the B pillar of the vehicle.

The handle assembly may comprise any suitable type of handle assembly, and may include or incorporate aspects of the door handle assemblies described in U.S. Pat. Nos. 8,786,401; 6,977,619; 7,407,203 and/or 8,333,492, and/or U.S. Publication Nos. US-2022-0341226; US-2022/0282534; US-2022/0018168 and/or US-2020/0102773, which are all hereby incorporated herein by reference in their entireties.

The handle assembly may utilize aspects of the handle assemblies described in U.S. Pat. Nos. 6,349,450; 6,550,103 and/or 6,907,643, which are hereby incorporated herein by reference in their entireties) or other type of vehicle door handle assembly. Optionally, the door handle assembly may include a soft touch handle portion, such as utilizing the principles described in U.S. Pat. Nos. 6,349,450; 6,550,103 and/or 6,907,643, incorporated above.

Although shown and described as being a generally horizontally oriented handle portion at the side of the vehicle, it is envisioned that the handle of the door handle assembly may be oriented in any manner. For example, the handle may be oriented so that it is either vertical, horizontal, or diagonal with respect to the ground. Also, although shown and described as an exterior door handle for opening a side door or rear door or lift gate of a vehicle from exterior the vehicle, it is envisioned that the door handle assembly may be suitable for use as an interior handle for opening a side door or rear door or liftgate of a vehicle from inside the vehicle.

Optionally, the door handle assembly or module may include or may be associated with an antenna for receiving signals from or communicating with a remote device. For example, the antenna (such as, for example, an antenna of the types described in U.S. Pat. No. 6,977,619 and/or U.S. Publication No. US-2010/0007463, which are hereby incorporated herein by reference in their entireties) may communicate a signal to the door locking system via a wire connection or the like, or wirelessly, such as via a radio frequency signal or via an infrared signal or via other wireless signaling means. For example, the handle assembly may include an antenna or sensor (such as an antenna and/or capacitive sensor) at the handle portion and/or may include a passive entry device or element. The antenna or sensor and/or passive entry device may receive a signal from a transmitting device (such as from a key fob or the like carried by the driver of the vehicle) and/or may sense or detect the presence of or proximity of a person or person's hand at or near the door handle, and may generate an output signal indicative of such detection. The actuator may be responsive to the antenna and/or sensor and/or device to impart an outward movement of the door handle portion so that the user can grasp the handle portion to open the door of the vehicle.

Such connections can include cables, wires, fiber optic cables or the like. The communication to the locking system may be via a vehicle bus or multiplex system, such as a LIN (Local Interconnect Network) or CAN (Car or Controlled Area Network) system, such as described in U.S. Pat. Nos. 6,291,905; 6,396,408 and/or 6,477,464, which are all hereby incorporated herein by reference in their entireties. The vehicle door may then be unlocked and/or illumination source or sources may be activated as a person carrying a remote signaling device approaches the door handle. Optionally, other systems may be activated in response to the remote signaling device, such as vehicle lighting systems, such as interior lights, security lights or the like (such as security lights of the types disclosed in U.S. Pat. Nos. 6,280,069; 6,276,821; 6,176,602; 6,152,590; 6,149,287; 6,139,172; 6,086,229; 5,938,321; 5,671,996; 5,497,305; 6,416,208 and/or 6,568,839, all of which are hereby incorporated herein by reference in their entireties), or the vehicle ignition, or any other desired system.

Changes and modifications to the specifically described embodiments may be carried out without departing from the principles of the present invention, which is intended to be limited only by the scope of the appended claims as interpreted according to the principles of patent law.

The invention claimed is:

1. A vehicular exterior door handle assembly, the vehicular exterior door handle assembly comprising:

a base portion configured to mount at a door of a vehicle equipped with the vehicular exterior door handle assembly;

a handle portion extending from the base portion;

an electronic switch disposed at the handle portion;

wherein the handle portion includes (i) an extending portion that, with the base portion mounted at the door of the vehicle, extends outward from the door of the vehicle, and (ii) a movable portion disposed at the extending portion and movable relative to the extending portion;

wherein, with the base portion mounted at the door of the vehicle, the movable portion is disposed between the electronic switch and the base portion;

wherein, when the handle portion is grasped by a user, the movable portion moves relative to the extending portion and outward away from the door and away from the base portion to engage the electronic switch and actuate the electronic switch; and wherein, with the base portion mounted at the door of the vehicle, and when the electronic switch is actuated, the electronic switch actuates a latching mechanism of the door to at least one selected from the group consisting of (i) unlock the door, (ii) lock the door and (iii) open the door.

2. The vehicular exterior door handle assembly of claim 1, wherein the electronic switch is disposed within the extending portion.

3. The vehicular exterior door handle assembly of claim 1, wherein the handle portion includes a flexible element that is at an outer surface of the extending portion, and wherein the flexible element is disposed at the movable portion such that, when the handle portion is grasped by the user, the flexible element flexes to move the movable portion to actuate the electronic switch.

4. The vehicular exterior door handle assembly of claim 1, wherein the movable portion is pivotable relative to the extending portion.

5. The vehicular exterior door handle assembly of claim 1, wherein the electronic switch is disposed within an internal module that is disposed within the handle portion.

6. The vehicular exterior door handle assembly of claim 1, wherein the extending portion includes a first plurality of movement limiting surfaces, and wherein the movable portion includes a second plurality of movement limiting surfaces disposed opposite corresponding ones of the first plurality of movement limiting surfaces, and wherein, when the extending portion is grasped by the user with an off center force being applied to the movable portion, one or more of the first plurality of movement limiting surfaces engage one or more of the second plurality of movement limiting surfaces to limit non-parallel movement of the movable portion relative to the extending portion so that the off center force actuates the electronic switch.

7. The vehicular exterior door handle assembly of claim 6, wherein the non-parallel movement includes at least one selected from the group consisting of (i) a tilting movement of the movable portion relative to the extending portion, (ii) a tipping movement of the movable portion relative to the extending portion, (iii) a pivoting movement of the movable portion relative to the extending portion and (iv) a rotating movement of the movable portion relative to the extending portion.

8. The vehicular exterior door handle assembly of claim 1, wherein the extending portion is fixed relative to the base portion.

9. The vehicular exterior door handle assembly of claim 1, wherein the handle portion includes a flexible element that is at an outer surface of the extending portion, and wherein the flexible element is disposed at the movable portion such that, when the extending portion is grasped by the user, the flexible element flexes to move the movable portion to actuate the electronic switch.

10. The vehicular exterior door handle assembly of claim 1, wherein the electronic switch is disposed within the extending portion and wherein the movable portion is disposed at an outer surface of the extending portion.

11. A vehicular exterior door handle assembly, the vehicular exterior door handle assembly comprising:

a base portion configured to mount at a door of a vehicle equipped with the vehicular exterior door handle assembly;

a handle portion extending from the base portion;

an electronic switch disposed within the base portion;

wherein, with the base portion mounted at the door of the vehicle, the handle portion is disposed between the electronic switch and the base portion;

wherein, with the base portion mounted at the door of the vehicle, the handle portion extends outward from the door of the vehicle, and wherein, when the handle portion is grasped by a user, the handle portion moves relative to the base portion and outward away from the door and away from the base portion to engage the electronic switch and actuate the electronic switch; and wherein, with the base portion mounted at the door of the vehicle, and when the electronic switch is actuated, the electronic switch actuates a latching mechanism of the door to at least one selected from the group consisting of (i) unlock the door, (ii) lock the door and (iii) open the door.

12. The vehicular exterior door handle assembly of claim 11, wherein the handle portion is pivotally attached at the base portion.

13. The vehicular exterior door handle assembly of claim 11, wherein the base portion includes a flexible element that is at an outer surface of the base portion, and wherein the handle portion extends through an aperture of the flexible element such that, when the handle portion is grasped by the user, the flexible element flexes and the handle portion moves to actuate the electronic switch.

14. The vehicular exterior door handle assembly of claim 13, wherein the handle portion is pivotable relative to the base portion.

15. The vehicular exterior door handle assembly of claim 11, wherein the electronic switch is disposed at an outboard structure of the base portion.

* * * * *